US010455576B2

(12) United States Patent
Kato

(10) Patent No.: US 10,455,576 B2
(45) Date of Patent: Oct. 22, 2019

(54) RADIO BASE STATION APPARATUS, RADIO RESOURCE MANAGEMENT METHOD, RADIO RESOURCE MANAGEMENT PROGRAM, WIRELESS COMMUNICATION APPARATUS, AND WIRELESS COMMUNICATION SYSTEM

(71) Applicant: Panasonic Intellectual Property Management Co., Ltd., Osaka (JP)

(72) Inventor: Osamu Kato, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/354,104

(22) PCT Filed: Oct. 31, 2012

(86) PCT No.: PCT/JP2012/007003
§ 371 (c)(1),
(2) Date: Apr. 24, 2014

(87) PCT Pub. No.: WO2013/065306
PCT Pub. Date: May 10, 2013

(65) Prior Publication Data
US 2014/0293945 A1 Oct. 2, 2014

(30) Foreign Application Priority Data
Oct. 31, 2011 (JP) .................................. 2011-239529

(51) Int. Cl.
*H04W 72/04* (2009.01)
*H04W 16/14* (2009.01)
*H04W 72/08* (2009.01)

(52) U.S. Cl.
CPC ....... *H04W 72/0453* (2013.01); *H04W 16/14* (2013.01); *H04W 72/082* (2013.01)

(58) Field of Classification Search
None
See application file for complete search history.

(56) References Cited

U.S. PATENT DOCUMENTS 6,466,793 B1 * 10/2002 Wallstedt .............. H04W 16/10
455/444
6,898,431 B1 * 5/2005 Peele .................... H04W 28/16
455/450

(Continued)

FOREIGN PATENT DOCUMENTS

WO 2007/000740 A1 1/2007
WO 2010/057302 A1 5/2010

OTHER PUBLICATIONS

Filin et al., "Performance evaluation of IEEE 802.19.1 white space coexistence services," IEICE Technical Report, SR2010-79, Jan. 2011, 8 pages.

(Continued)

*Primary Examiner* — Kevin C. Harper
*Assistant Examiner* — Derrick V Rose
(74) *Attorney, Agent, or Firm* — Seed IP Law Group LLP

(57) ABSTRACT

A radio base station apparatus allocates a white space frequency to a wireless communication apparatus, and includes a radio resource allocating unit that allocates to the wireless communication apparatus a first white space frequency that the radio station apparatus allocates to another wireless communication apparatus, among a plurality of white space frequencies, according to an allocation request for a communication frequency from the wireless communication apparatus.

20 Claims, 14 Drawing Sheets

(56) References Cited

U.S. PATENT DOCUMENTS

| | | | | |
|---|---|---|---|---|
| 7,539,496 | B1* | 5/2009 | Sousa | H04W 72/08 370/310 |
| 8,131,304 | B2 | 3/2012 | Chaudhri et al. | |
| 2002/0082021 | A1* | 6/2002 | Chen | H04W 72/10 455/450 |
| 2008/0051090 | A1* | 2/2008 | Kobayashi | H04W 36/06 455/436 |
| 2009/0262699 | A1* | 10/2009 | Wengerter | H04L 1/0072 370/330 |
| 2010/0124254 | A1 | 5/2010 | Wu et al. | |
| 2010/0144365 | A1* | 6/2010 | Pan | H04W 72/0486 455/453 |
| 2010/0248631 | A1 | 9/2010 | Chaudhri et al. | |
| 2010/0309806 | A1* | 12/2010 | Wu | H04H 20/423 370/252 |
| 2011/0134892 | A1* | 6/2011 | Shirakabe | H04W 72/10 370/336 |
| 2011/0165903 | A1* | 7/2011 | Selen | H04W 16/14 455/509 |
| 2011/0250858 | A1 | 10/2011 | Jain et al. | |
| 2011/0307612 | A1* | 12/2011 | Junell | H04W 16/14 709/226 |
| 2012/0096498 | A1 | 4/2012 | Wu et al. | |
| 2013/0053043 | A1* | 2/2013 | Wei | H04W 36/0055 455/437 |

OTHER PUBLICATIONS

International Search Report dated Dec. 4, 2012, for corresponding International Application No. PCT/JP2012/007003, 2 pages.

Yomogida, "Wireless LAN Business in Excitement about TV's White Space Utilization, " Nikkei Electronics, Aug. 8, 2011, 2 pages.

Akyildiz et al., "NeXt generation / dynamic spectrum access / cognitive radio wireless networks: A survey," Computer Networks 50:2127-2159, 2006.

Extended European Search Report dated Nov. 6, 2015, for corresponding EP Application No. 12845848.6-1857 / 2775748, 8 pages.

Communication pursuant to Article 34(3) EPC, dated Jul. 2, 2018, for the related European Patent Application No. 12 845 848.6-1215, 6 pages.

* cited by examiner

RADIO BASE STATION APPARATUS, RADIO
RESOURCE MANAGEMENT METHOD,
RADIO RESOURCE MANAGEMENT
PROGRAM, WIRELESS COMMUNICATION
APPARATUS, AND WIRELESS
COMMUNICATION SYSTEM

TECHNICAL FIELD

The present invention relates to a radio base station apparatus, a radio resource management method, a radio resource management program, a wireless communication apparatus, and a wireless communication system. The present invention relates particularly to a radio base station apparatus and the like that perform a communication using a white space frequency.

BACKGROUND ART

In recent years, from the perspective of effective utilization of a communication frequency, many discussions have been made with a view toward using a frequency (i.e., a white space frequency) included in a communication frequency band that is allocated for broadcasting or communication but is not actually used and thus toward enabling a plurality of wireless communication systems (for example, communication that uses predetermined wireless communication standards between a wireless communication terminal and a base station apparatus) to utilize such a white space frequency band. In addition to a communication service provider (the first service provider) that is permitted to perform communication that uses an occupied frequency band, a communication service provider (the second service provider) that does not have the occupied frequency band and the like can use the white space frequency.

In the future, the first service provider and the second service provider (particularly, the second service provider) will desire to frequently use a lot of radio resources of the white space frequency, and it is expected that the radio resource of the white space frequency will be actually used in such a manner.

With this expected situation in mind, technologies have been discussed for preventing interference in mutual communication that results when a plurality of communications are performed at the same time using the white space frequency (for example, refer to Non Patent Literature 1).

Furthermore, in order to prevent the interference in the mutual communication, scanning technologies (discovery service) have been discussed for enabling a communication apparatus in communication operation to grasp a usage status of the white space frequency (for example, refer to Non Patent Literature 2).

CITATION LIST

Non Patent Literature

Non Patent Literature 1: Hiroki Yomogida, "TV white space katsuyohe, wakitatsu musen LAN gyoukai (Wireless LAN Business in Excitement about TVs White Space Utilization)," NIKKEI ELECTRONICS, Aug. 8, 2011.
Non Patent Literature 2: Stanislav FILIN, Tuncer BAYIAS, M. Azizur RAHMAN. Hiroshi HARADA, "Performance evaluation of IEEE 802.19.1 white space coexistence services," Technical Report, the Institute of Electronics, Information and Communication Engineers, January 2011, pp. 57-64.

SUMMARY OF INVENTION

Technical Problem

However, because it is not determined which white space frequency has to be allocated to each service provider, there is a likelihood that in the future, inconvenience will occur in allocating radio resources of the white space frequency. For example, in an area of a certain service provider's base station, when the radio resources of many of the white space frequencies are allocated without utilizing the white space frequencies to the maximum, a concern occurs in that the white space frequency that satisfies a condition under which the allocation is possible runs short in another service provider.

In view of the situations described above, an object of the present invention is to provide a radio base station apparatus for, a radio resource management method of, a radio resource management program for, a wireless communication apparatus for, and a wireless communication system for effectively utilizing a white space frequency.

Solution to Problem

A radio base station apparatus according to the present invention is a radio base station apparatus that allocates a white space frequency to a wireless communication apparatus, the radio base station apparatus including: a radio resource allocating unit that is adapted to allocate a first white space frequency to the wireless communication apparatus among a plurality of white space frequencies in response to an allocation request for a communication frequency from the wireless communication apparatus, wherein the first white space frequency has been allocated to another wireless communication apparatus by the radio base station apparatus.

With this configuration, the wireless communication base station can effectively utilize one white space frequency, and the successive use of new white space frequencies by one wireless communication base station can be suppressed. Therefore, the radio base station can effectively use the white space frequency, in cooperation with another radio base station apparatus.

The radio base station apparatus according to the present invention may be configured so that if the first white space frequency and a second white space frequency are present, the radio resource allocating unit allocates the second white space frequency to the wireless communication apparatus, wherein more other wireless communication apparatuses are allocated to the second white space frequency than to the first white space frequency.

With this configuration, because the wireless communication apparatus is not allocated to the white space frequency that has a small number of allocations to other wireless communication apparatuses, it can be expected that an allocated state of the radio resource of such a white space frequency is early ended. Therefore, the white space frequency can be effectively utilized.

The radio base station apparatus according to the present invention may be configured so that if a third white space frequency is present, the radio resource allocating unit allocates the third white space frequency to the wireless communication apparatus, wherein the third white space frequency has a larger allocated amount of radio resource than that of the first white space frequency.

With this configuration, the wireless communication terminal is made not to be allocated to the white space frequency that has a small allocated amount of the radio resource, and thus it can be expected that an allocated state of the radio resource of such a white space frequency is early ended. Therefore, the white space frequency can be effectively utilized.

The radio base station apparatus according to the present invention may be configured so that the radio resource allocating unit allocates to the wireless communication apparatus a white space frequency that has an amount of allocated radio resource that is below a predetermined threshold.

With this configuration, a change in the radio resource in use can be responded to using the white space frequency. Therefore, the radio resource of one white space frequency is not used in a biased manner, and a packet transmission delay or a packet loss is difficult to occur. This improves communication quality.

The radio base station apparatus according to the present invention may be configured by further including a use-state detecting unit that is adapted to detect a use-state of a white space frequency in a neighborhood of the radio base station apparatus, wherein if an amount of allocated radio resource of the first white space frequency is a predetermined threshold or above, the radio resource allocating unit allocates to the wireless communication apparatus a radio resource of the white space frequency in which use of radio resource is undetected by the use-state detecting unit.

With this configuration, the radio resource of the white space frequency that is not used by the wireless communication apparatus that is managed by another radio base station apparatus can be allocated. Therefore, interference with another radio base station apparatus can be suppressed in the communication that uses the white space frequency.

The radio base station apparatus according to the present invention may be configured by further including a receiving unit that is adapted to receive information on a use-state of the white space frequency in a neighborhood of the wireless communication apparatus from the wireless communication apparatus that performs the allocation request for the communication frequency wherein if the allocated amount of the radio resource of the first white space frequency is the predetermined threshold or above, the radio resource allocating unit allocates to the wireless communication apparatus a radio resource of the white space frequency in which use of radio resource is undetected, based on the information received by the receiving unit.

With this configuration, the precision of the communication that uses the white space frequency can be improved by adding a usage status of the white space frequency in the neighborhood of a base station and a use status of the white space frequency in the neighborhood of the wireless communication terminal that actually performs the communication.

The radio base station apparatus according to the present invention may be configured so that the allocated amount of the radio resource is an amount of the radio resource that is already allocated to the wireless communication apparatus.

With this configuration, based on an amount of the already-allocated radio resource that the radio resource is already allocated, the allocation of the radio resource of the proper white space frequency can be determined.

The radio base station apparatus according to the present invention may be configured so that the allocated amount of the radio resource is a total amount that is obtained by adding an amount of the radio resource that is already allocated to the wireless communication apparatus and a requested amount of the radio resource in the allocation request for the communication frequency.

With this configuration, the allocation of the radio resource of the proper white space frequency can be determined by adding the amount of the already-allocated radio resource and an amount of the allocation-requested radio resource.

The radio base station apparatus according to the present invention may be configured by further including a transmitting unit that is adapted to transmit packet division request information for requesting division of a transmission-target packet, to the wireless communication apparatus that performs the allocation request if the allocated amount of the radio resource of the first white space frequency is a predetermined threshold or above; and a receiving unit that is adapted to receive division information on the transmission-target packet in association with the packet division request information, wherein the radio resource allocating unit allocates to the wireless communication apparatus a non-allocated radio resource of the first white space frequency and a non-allocated radio resource of another white space frequency based on the division information on the packet which is received by the receiving unit.

With this configuration, the white space frequency that has the already-allocated radio resource can be utilized to the maximum and desired communication quality can be secured.

The radio base station apparatus according to the present invention may be configured so that if the second white space frequency and the third white space frequency are present, the radio resource allocating unit allocates the second white space frequency to the wireless communication apparatus.

With this configuration, the wireless communication apparatus is made not to be allocated to the white space frequency that has a small number of allocations to other wireless communication apparatuses, and thus it can be expected that an allocated state of the radio resource of such a white space frequency is early ended. Therefore, the white space frequency can be effectively utilized.

The radio base station apparatus according to the present invention may be configured so that the radio resource has a plurality of resource blocks divided in a frequency domain.

With this configuration, the communication can be performed by using a predetermined frequency bandwidth that is included in the white space frequency.

The radio base station apparatus according to the present invention may be configured so that the radio resource has a plurality of resource blocks divided in a time domain.

With this configuration, the communication can be performed by using a predetermined time width that is included in the time that is used in the communication on the white space frequency.

A radio resource management method according to the present invention is a radio resource management method for use in a radio base station apparatus that allocates a white space frequency to a wireless communication apparatus, the method including: a step of allocating a first white space frequency to the wireless communication apparatus among a plurality of white space frequencies in response to an allocation request for a communication frequency from the wireless communication apparatus, wherein the first white space frequency is allocated to another wireless communication apparatus by the radio base station apparatus.

With this method, the wireless communication base station can effectively utilize one white space frequency, and the successive use of new white space frequencies by one wireless communication base station can be suppressed. Therefore, the radio base station can effectively use the white space frequency, in cooperation with another radio base station apparatus.

A radio resource management program according to the present invention is a program for causing a computer to execute each step of the radio resource management method.

With this program, the wireless communication base station can effectively utilize one white space frequency, and the successive use of new white space frequencies by one wireless communication base station can be suppressed. Therefore, the radio base station can effectively use the white space frequency in cooperation with another radio base station apparatus.

A wireless communication apparatus according to the present invention is a wireless communication apparatus that performs communication using a white space frequency, the wireless communication apparatus including: a receiving unit that is adapted to receive information on a first white space frequency that is allocated to the wireless communication apparatus by a radio base station apparatus; and a transmitting unit that is adapted to transmit a signal by using the first white space frequency, wherein the first white space frequency corresponds to a frequency band that is allocated to another wireless communication apparatus by the radio base station apparatus among a plurality of white space frequencies.

With this configuration, the wireless communication apparatus shares one white space frequency with another wireless communication apparatus. Because of this, the wireless communication base station can effectively utilize one white space frequency, and the successive use of new white space frequencies by one wireless communication base station can be suppressed. Therefore, the radio base station can effectively use the white space frequency, in cooperation with another radio base station apparatus.

The wireless communication apparatus according to the present invention may be configured so that if there is a second white space frequency to which more other wireless communication apparatuses are allocated than to the first white space frequency, the receiving unit receives information relating to the second white space frequency and the transmitting unit transmits a signal by using the second white space frequency.

With this configuration, the wireless communication apparatus uses the white space frequency that has a large number of allocations to other wireless communication apparatuses, and thus it can be expected that an allocated state of the radio resource of such a white space frequency is early ended. Therefore, the white space frequency can be effectively utilized.

The wireless communication apparatus according to the present invention may be configured so that if there is a third white space that has a larger allocated amount of radio resource than that of the first white space frequency, the receiving unit receives information relating to the third white space frequency and the transmitting unit transmits a signal by using the third white space frequency.

With this configuration, the wireless communication apparatus uses the white space frequency that has a large number of the allocated radio resource, and thus it can be expected that an allocated state of the radio resource of such a white space frequency is early ended. Therefore, the white space frequency can be effectively utilized.

The wireless communication apparatus according to the present invention may be configured so that the transmitting unit transmits an allocation request for the white space frequency to the radio base station apparatus.

With this configuration, the wireless communication apparatus is allocated the WS frequency from the radio base station apparatus at arbitrary timing and the communication that uses the white space frequency can be performed.

A wireless communication system according to the present invention is a wireless communication system that performs a communication using a white space frequency, the wireless communication system including: a wireless communication base station that is adapted to transmit information relating to a first white space frequency to which another wireless communication apparatus is allocated among a plurality of white space frequencies; and a wireless communication apparatus that is adapted to perform a communication using the first white space frequency.

With this configuration, the wireless communication apparatus shares one white space frequency with another wireless communication apparatus. Because of this, the wireless communication base station can effectively utilize one white space frequency, and the successive use of new white space frequencies by one wireless communication base station can be suppressed. Therefore, the radio base station can effectively utilize the white space frequency, in cooperation with another radio base station apparatus.

Advantageous Effects of Invention

According to the aspects of the present invention, the white space frequency can be effectively utilized.

DESCRIPTION OF EMBODIMENTS

Figure 1:
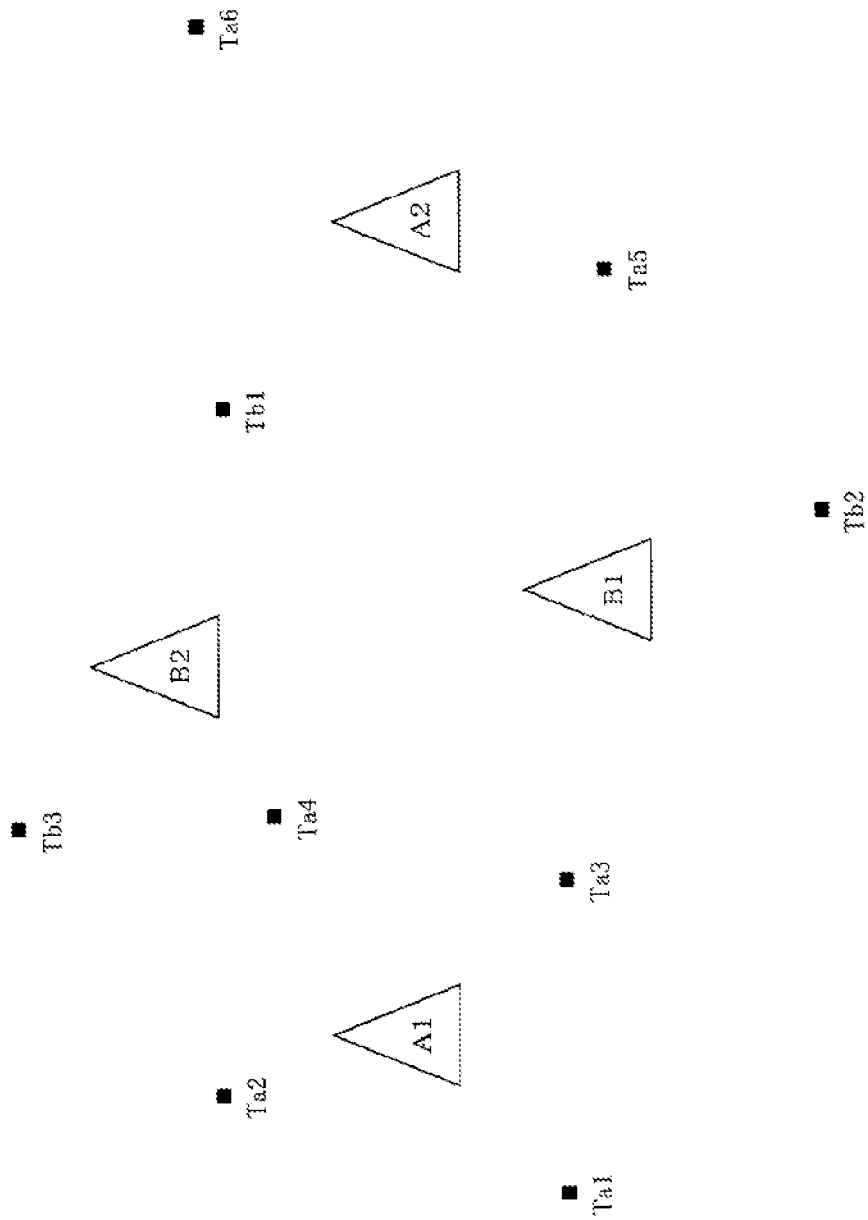
FIG. 1 illustrates an arrangement example of a plurality of radio base station apparatuses and a plurality of wireless communication terminals in a plurality of wireless communication systems according to an embodiment of the present invention.

An embodiment of the present invention is described below referring to the drawings.

FIG. 1 illustrates an arrangement example of a plurality of radio base station apparatuses and a plurality of wireless communication terminals in a plurality of wireless communication systems according to the embodiment of the present invention. Reference characters A1, A2, B1, and B2 indicate the radio base station apparatuses that are arranged in their respective base stations. Reference characters Ta1 to Ta6 and Tb1 to Tb3 are the wireless communication terminals that are managed by the radio station apparatuses A1 or A2 and B1 or B2.

The radio base station apparatus A1 and the wireless communication terminals Ta1 to Ta4 make up one wireless communication system. The radio base station apparatus A2 and the wireless communication terminals Ta5 to Ta6 make up one wireless communication system. The radio base station apparatus B1 and the wireless communication terminal Tb2 make up one wireless communication system. The radio base station apparatus B2 and the wireless communication terminals Tb1 and Tb3 make up one wireless communication system. Therefore, FIG. 1 illustrates a communication environment in which the four wireless communication systems are present in a mixed manner.

The radio base station apparatuses A1 and A2 indicate the radio base station apparatus of the same communication service provider, and in the same manner, the radio base station apparatuses B1 and B2 indicate the radio base station apparatuses of the other communication service providers. The radio base station apparatuses that do not belong to the same communication service provider may cooperate with one another to perform various tasks of processing. Furthermore, the communication terminal may be a mobile terminal that is capable of being carried.

It is assumed that a communication method for the wireless communication system according to the present embodiment is through communication that uses wireless local area network (IAN), communication that uses wireless regional area network (RAN) such as IEEE 802.22 specifications, communication that uses cellular-type wireless communication method such as long term evolution (LTE), or the like.

Moreover, in the following description, a statement that a white space frequency (a radio resource thereof) is allocated to a wireless communication apparatus and a statement that a wireless communication apparatus is allocated to a white space frequency (a radio resource thereof) are intended to mean the same events. In other words, either of the statements has the same contents.

Figure 2:
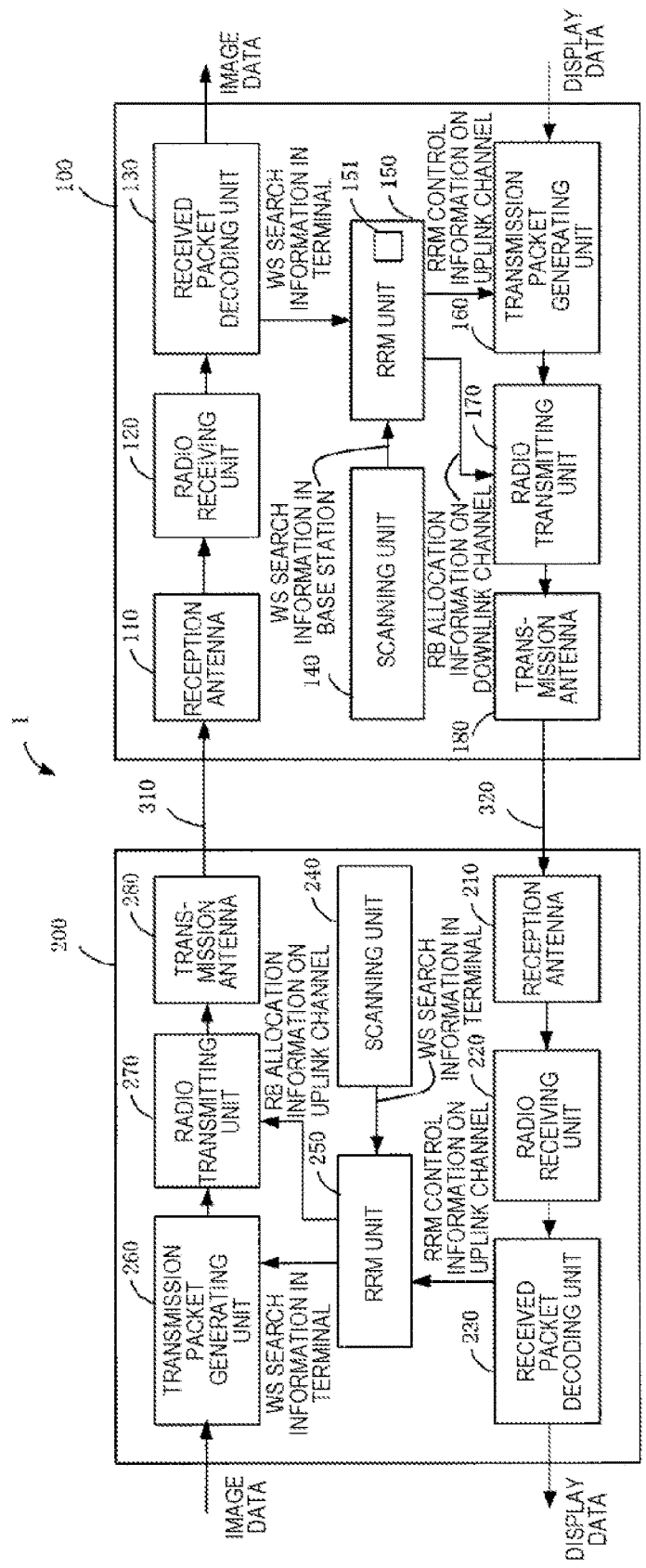
FIG. 2 is a block diagram illustrating a configuration example of the radio base station apparatus and the wireless communication terminal according to the embodiment of the present invention.

FIG. 2 is a block diagram illustrating a configuration example of the radio base station apparatus and the wireless communication terminal according to the embodiment of the present invention. A radio base station apparatus 100 illustrated in FIG. 2 corresponds to each of the radio base station apparatuses A1, A2, B1, and B2 illustrated in FIG. 1, and any of the radio base station apparatuses has the same configuration. The wireless communication terminal 200 illustrated in FIG. 2 corresponds to each of the wireless communication terminals Ta1 to Ta6 and Tb1 to Tb3 illustrated in FIG. 1, and any of the wireless communication terminal has the same configuration. Descriptions are provided below as the radio base station apparatus 100 (simply referred to as the "base station 100") and the wireless communication terminal 200 (simply referred to as the "terminal 200").

Furthermore, the base station 100 and the terminal 200 are one wireless communication apparatus that is managed by the base station 100. That is, in the following description, the wireless communication apparatus includes the base station 100 and the terminal 200. Then, the base station 100 determines which WS frequency of the plurality of white base frequencies (hereinafter referred to as the "WS frequencies") is allocated to the wireless communication apparatus (this is described in detail below). Thus, the base station 100 may determine the WS frequency between the base station 100 and another base station 100, but a description is provided below using the base station 100 and the terminal 200 as an example.

Moreover, the wireless communication apparatus that is managed by the base station 100 is, for example, the wireless communication apparatus that is in a state of being connected to the base station 100. The wireless communication apparatus in the connected state can perform communication using the WS frequency that is allocated by the base station 100. On the other hand, the base station 100 cancels a connected state of the wireless communication apparatus that performs a disconnection request, a connected state of the wireless communication apparatus that does not perform communication for a predetermined time, or a connected state of the wireless communication apparatus that terminates the communication (terminates the use of the radio resource described below). That is, these wireless communication apparatuses remain out of the management of the base station 100. Of course, the method of canceling the connected state, described above, is one example. The method of canceling the connected state is not limited particularly to the one described above.

The base station 100 includes a reception antenna 110, a radio receiving unit 120, a received packet decoding unit 130, a scanning unit 140, a radio resource management (RRM) unit 150, a transmission packet generating unit 160, a radio transmitting unit 170, and a transmission antenna 180.

A radio link that is established between the base station 100 and the terminal 200 includes an uplink 310 over which a signal (a packet) is transmitted from the terminal 200 to the base station 100 and a downlink 320 over which the signal (the packet) is transmitted from the base station 100 to the terminal 200. The base station 100 performs the communication over the radio uplink between the base station 100 and the terminal 200, using the radio resource of the white space frequency (hereinafter referred to as the WS frequency).

The reception antenna 110 receives a communication signal that is communicated over the uplink 310 and outputs the communication signal, as a received signal, to the radio receiving unit 120.

The radio receiving unit 120 receives the received signal from the reception antenna 110. Then, predetermined demodulating processing, frequency converting processing, or the like is performed on the received signal, and a received packet is obtained from the received signal. The radio receiving unit 120 outputs the received packet to the received packet decoding unit 130.

The received packet decoding unit 130 receives the received packet from the radio receiving unit 120 and performs decoding processing on the received packet. With the decoding processing, the received packet decoding unit 130 obtains user data (for example, image data, voice data, or the like) or control data from the terminal 200. The control data may include white space search information (WS search information) that includes a result of scanning processing by the terminal 200.

The scanning unit 140 performs the scanning processing (this processing here is referred to as carrier scanning, and a carrier means a carrier wave that conveys a wireless signal) for the purpose of conducting a search to check for the presence or the absence of wireless communication using the WS frequency in the neighborhood of the base station 100. In other words, the scanning unit 140 functions as a use-state detecting unit that detects a use-state of the radio resource of the WS frequency. The scanning unit 140 outputs a result of the scanning processing, as the WS search information in the base station 100, to the RRM unit 150.

In the scanning processing, for example, if in the WS frequency having a bandwidth of 6 MHz, an output of a sensor that the scanning unit 140 has is −114 dBm or greater, it is determined that another carrier is detected, that is, that the WS frequency thereof is used. On the other hand, if the output of the sensor is less than −114 dBm, it is determined that another carrier is undetected, that is, that the WS frequency thereof is not used and has no interference.

The RRM unit 150 has an internal memory 151. Information indicating to which one of the wireless communication apparatuses managed by the base station 100 the radio resource of which one of the WS frequencies is allocated is stored in the internal memory 151. The information is equivalent to information indicating an allocated state of the radio resource of the WS frequency. The RRM unit 150 allocates to the terminal 200 the non-allocated radio resource of the WS frequency that satisfies a predetermined condition, referring to the information on the allocated state that is stored in the memory 151. A method of allocating the radio resource of the WS frequency is described in detail below.

Furthermore, in response to an allocation request from the terminal 200, the RRM unit 150 determines the WS frequency to be allocated to the terminal 200. Then, preferably, the RRM unit 150 determines the radio resource in use in communicating with the terminal 200. The RRM unit 150 causes the information determined here to be included in RRM control information on the uplink 310 and thus outputs the information included in the RRM control information to the transmission packet generating unit 160. The RRM control information includes at least information on the WS frequency to which a source of the allocation request is allocated. The source of the allocation request here may be the terminal 200 or be another base station 100.

Furthermore, the RRM unit 150 determines the radio resource of the WS frequency to be allocated in response to the allocation request of its own base station 100. The RRM unit 150 causes the information determined here to be included in RB allocation information on the downlink 320 and thus outputs the information included in the RB allocation information to the radio transmitting unit 170.

Furthermore, the RRM unit 150 considers a result of the scanning processing by the scanning unit 140 and thus allocates to the terminal 200 the radio resource of the WS frequency that is not used by another carrier that is present. Accordingly, an interference condition (in which the interference is undetected), which is a precondition that the communication using the WS frequency should be performed, can be satisfied.

Additionally, the RRM unit 150 may allocate the radio resource of the WS frequency to the terminal 200, also based on the WS search information in the terminal 200, which is transmitted from the terminal 200. In some cases, the result of the scanning processing in the base station 100 and the result of the scanning processing in the terminal 200 are assumed to differ depending on their respective neighboring communication environment. Now, the desirable WS frequency can be determined in the communication between the base station 100 and the terminal 200 (or another base station 100) by adding also the result of the scanning processing by the terminal 200 that actually performs the communication over the uplink 310. That is, the precision of the communication can be further improved that uses the WS frequency.

Moreover, if the result of the scanning processing by the base station 100 and the result of the scanning processing by the terminal 200 are different from each other, when the RRM unit 150 performs the determination of the WS frequency to which the terminal 200 is allocated, the result of the scanning processing by the base station 100 may take precedence, or the result of the scanning processing by the terminal 200 may take precedence.

The transmission packet generating unit 160 generates a transmission packet that includes the user data (for example, display data for the image data from the terminal 200) or the control data that is destined to the terminal 200. The control data includes an RRM control signal over the uplink 310, which is obtained from the RRM unit 150. The transmission packet generating unit 160 outputs the generated transmission packet to the radio transmitting unit 170.

The radio transmitting unit 170 performs a predetermined coding processing, the frequency converting processing, modulating processing, and the like on the transmission packet from the transmission packet generating unit 160. Then, a transmission signal is generated from the transmission packet, based on the RB allocation information on the downlink 320 from the RRM unit 150. The radio transmitting unit 170 outputs the generated transmission signal to the transmission antenna 180. Moreover, the RB allocation information here includes information on the WS frequency and the radio resource for transmitting the transmission packet over the downlink 320.

The transmission antenna 180 transmits the transmission signal, as the communication signal, from the radio transmitting unit 170 to the terminal 200 over the downlink 320.

The terminal 200 includes a reception antenna 210, a radio receiving unit 220, a received packet decoding unit 230, a scanning unit 240, an RRM unit 250, a transmission packet generating unit 260, a radio transmitting unit 270, and the transmission antenna 280.

The reception antenna 210 receives the communication signal that is communicated over the downlink 320 and outputs the communication signal, as the received signal, to the radio receiving unit 220.

The radio receiving unit 220 receives the received signal from the reception antenna 210. Then, the predetermined demodulating processing, the frequency converting processing, or the like is performed on the received signal, and the received packet is obtained from the received signal. The radio receiving unit 220 outputs the received packet to the received packet decoding unit 230.

The received packet decoding unit 230 receives the received packet from the radio receiving unit 220 and performs the decoding processing on the received packet. With the decoding processing, the received packet decoding unit 230 obtains the user data (for example, the display data) or the control data from the base station 100. The control data includes the RRM control information on the uplink 310.

The scanning unit 240 performs the scanning processing (the carrier scanning) for the purpose of conducting a search to check for the presence or the absence of the carrier in the communication using the WS frequency in the neighborhood of the terminal 200. In other words, the scanning unit 240 has a function of detecting the use-state of the radio resource of the WS frequency in the neighborhood of its own terminal 200. The scanning unit 240 outputs the result of the scanning processing, as the WS search information in the terminal 200, to the RRM unit 250. Moreover, the scanning unit 240 can be omitted.

The RRM unit 250 performs processing necessary for the base station 100 to allocate the radio resource of the WS frequency to its own terminal 200 between the RRM unit 250 and the RRM unit 150 of the base station 100.

Furthermore, the RRM unit 250 determines the WS frequency to be allocated to the terminal 200 and determines the radio resource to use, based on the RRM control information on the uplink 310 from the received packet decoding unit 230. In other words, the RRM unit 250 determines that the WS frequency and the radio resource that are determined by the base station 100, and that are included in the RRM control information on the uplink 310, are allocated to the terminal 200. The RRM unit 250 causes the information determined here to be included in the RB allocation information on the uplink 310 and thus outputs the information included in the RB allocation information to the radio transmitting unit 270.

Furthermore, if the scanning processing is performed by the scanning unit 240, the RRM unit 250 outputs to the transmission packet generating unit 260 the WS search information in the terminal 200, which is from the scanning unit 240.

The transmission packet generating unit 260 generates the transmission packet including the user data (for example, the image data, the voice data, or the like) or the control data that is destined to the base station 100. The control data may include the WS search information in the terminal 200, which is obtained from the RRM unit 250. The transmission packet generating unit 260 outputs the generated transmission packet to the radio transmitting unit 270.

The radio transmitting unit 270 performs a predetermined encoding processing, the frequency converting processing, modulating processing, and the like on the transmission packet from the transmission packet generating unit 260. Then, the transmission signal is generated from the transmission packet, based on the RB allocation information on the uplink 310, which is from the RRM unit 250. The radio transmitting unit 270 outputs the generated transmission signal to transmission antenna 280. Moreover, the RB allocation information here includes the WS frequency and the radio resource for transmitting the transmission packet over the uplink 310.

The transmission antenna 280 transmits the transmission signal, as the communication signal, from the radio transmitting unit 270 to the base station 100 over the uplink 310.

Next, the WS frequency and the radio resource are described.

Figure 3:
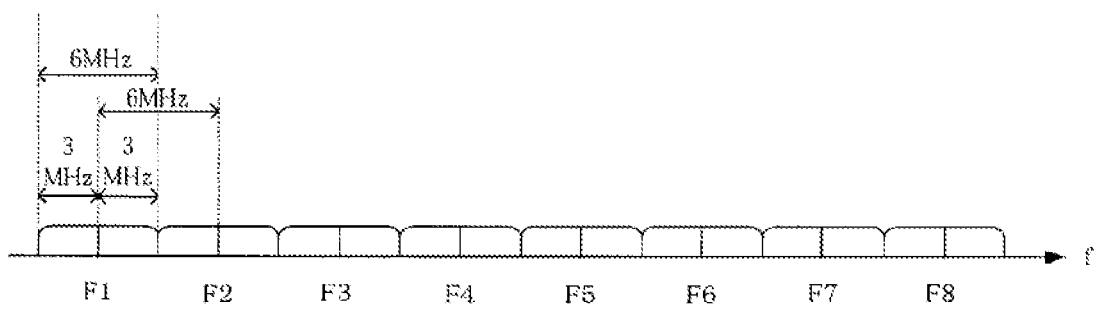
FIG. 3 illustrates one example of a white space frequency according to the embodiment.

FIG. 3 illustrates one example of the WS frequency. FIG. 3 illustrates that the WS frequencies include 8 WS frequencies F1 to F8, each having a frequency band of 6 MHz. Furthermore, it is illustrated that the WS frequencies are successive and there is a bandwidth of 6 MHz between each center frequency of the WS frequencies, but the WS frequencies may not be successive one after another. Furthermore, the bandwidth of the one WS frequency may be greater than or less than 6 MHz.

Figure 4:
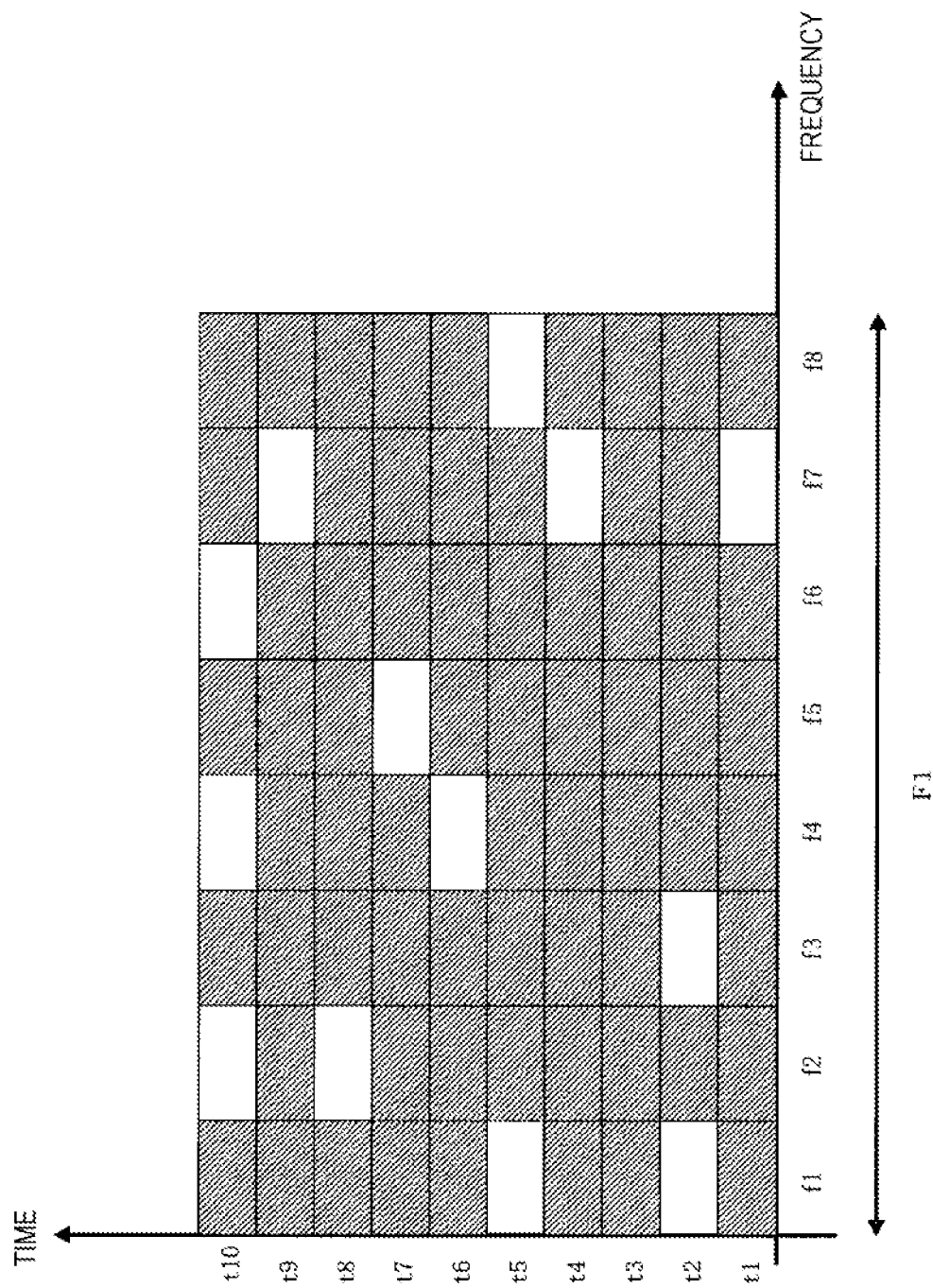
FIG. 4 illustrates one example of a radio resource according to the embodiment.

FIG. 4 illustrates one example of the radio resource. In the example in FIG. 4, the radio resource is set in a manner that is dividable in a frequency domain and in a time domain. Here, it is illustrated that the WS frequency F1 is divided by 8 into frequency bandwidths f1 to f8 in the frequency domain and a predetermined time (for example, 10 msec) is divided by 10 into time intervals t1 to t10 in the time domain. One block (for example, one block formed by the frequency bandwidth f1 and the time interval t1), among blocks that are obtained by performing the division in this manner, is a resource block (RB) as a minimum unit of the radio resource. In FIG. 4, the 80 RBs are prepared within the one WS frequency F1. The number of RBs may be greater than or less than 80.

Moreover, the number of the bandwidths obtained by the division in the frequency domain and the number of the time intervals obtained by the division in the time domain are not limited to this. Furthermore, the radio resource may not be configured from the resource blocks RB that are obtained by the division both in the frequency domain and in the time domain and may be configured from the resource blocks RB that are obtained by the division in at least one direction among the frequency domain and the time domain.

Next, a method of allocating the radio resource of the WS frequency is described in detail.

Here, first to seventh examples are described referring to FIGS. 5 to 11. In the first to seventh examples, the terminal Ta2 is assumed to perform the allocation request with respect to the base station 100.

Figure 5:
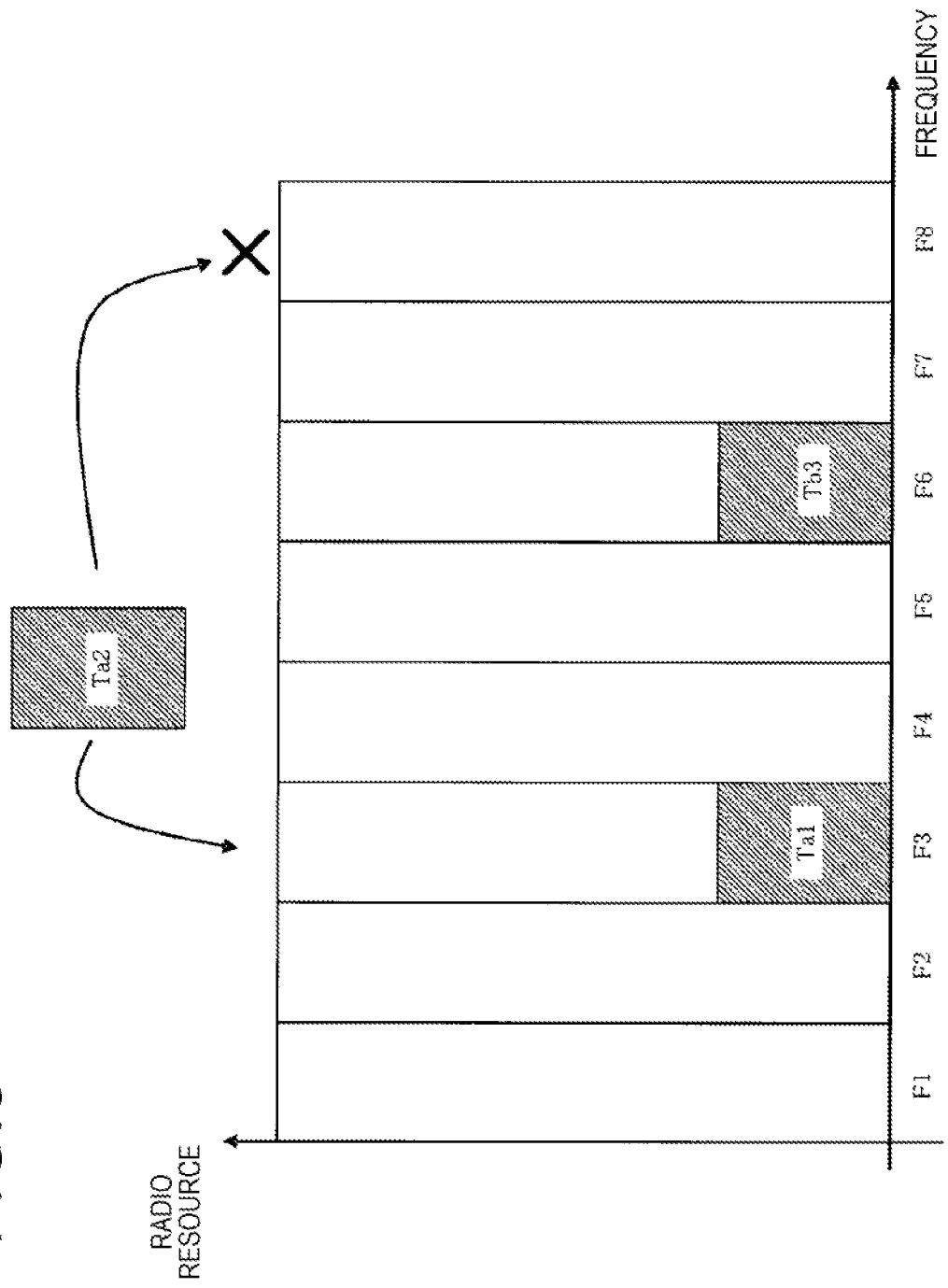
FIG. 5 illustrates a first example of a method of allocation of the radio resource of the white space frequency by the radio base station apparatus according to the embodiment of the present invention.

FIG. 5 illustrates the first example of the method of allocating the radio resource of the WS frequency in the base station 100. In the first example, the base station 100 retains in the internal memory 151 of the RRM unit 150 information that the radio resource of the WS frequency F3 is allocated to the terminal Ta1. On the other hand, because the terminal Tb3 belongs to the wireless communication system that is managed by the base station B2 that is another base station, the base station 100 does not retain information that the terminal Tb3 uses the radio resource of the WS frequency F6. The base station 100 detects that the WS frequency F6 is in use, by the scanning processing by the scanning unit 140.

Referring to the internal memory 151, the RRM unit 150 of the base station 100 allocates to the terminal Ta2 the radio resource not yet allocated (the non-allocated radio resource), of the WS frequency F3 that has the radio resource that is already allocated to the terminal Ta1, that is, of the WS frequency F3 having the already-allocated radio resource, among the plurality of WS frequencies present in FIG. 5. On the other hand, if the WS frequency F3 having the already-allocated radio resource is present as illustrated in FIG. 5, the base station 100 does not basically allocate to the terminal Ta2 the radio resource of the WS frequency (for example, the WS frequency F8 (the non-allocated WS frequency)) to which the terminal 200 is not allocated.

In this manner, in response to the allocation request for a communication frequency, the RRM unit 150 as a radio resource allocating unit allocates a non-allocated radio resource of the WS frequency F3 to which the radio resource is allocated, among the plurality of WS frequencies F1 to F8, to the terminal Ta1 as the wireless communication apparatus that is managed by the base station 100.

Accordingly the base station 100 can effectively utilize the one WS frequency and can suppress the successive use of the new WS frequencies by the one base station 100 (the allocation of the terminal 200 or the base station 100). That is, the non-used WS frequency can be reserved for another radio base station apparatus. Therefore, even though another radio base station apparatus performs the scanning processing, because it is determined that the WS frequency is not in use, the base station 100 can effectively utilize the WS frequency together with another radio base station apparatus.

A state where the WS frequency is allocated to the wireless communication apparatus includes not only a state where the radio resource of the WS frequency is allocated to the wireless communication apparatus, but also includes a state where the radio resource of the WS frequency is not allocated to the wireless communication apparatus (a state where the WS frequency that is used by the wireless communication apparatus at the time of the communication is determined, but the radio resource of the WS frequency is not used).

Thus, the terminal Ta2 is allocated to the WS frequency F3 (that has the radio resource in use) having the already-allocated radio resource, but the WS frequency that is allocated to the terminal Ta2 does not necessarily need to have the already-allocated radio resource. In other words, the radio resource of the WS frequency that is allocated to the terminal Ta2 that another terminal 200 (the terminal Ta1 in the first example) does not need to use. That is, the RRM unit 150 may allocate to the terminal Ta2 the WS frequency that another terminal 200 that does not use the radio resource is scheduled to use at the time of the communication.

For example, in the WS frequency F3 illustrated in FIG. 5, also in a case where the terminal Ta1 stops the communication and is in a waiting state where the radio resource is not used (is not allocated), the WS frequency F3 is in a state where the terminal Ta1 is allocated to the WS frequency (the already-allocated WS frequency). Because of this, if the terminal Ta1 resumes the communication, the WS frequency F3 and the radio resource of the WS frequency F3 are used.

In summary, the RRM unit 150 allocates the already-allocated WS frequency to the terminal 200 (the terminal 200 that transmits the allocation request) that requests a new connection and thus the already-allocated WS frequency is the WS frequency to which the terminal 200 (or the base station 100) is allocated, regardless of the presence or the absence of the use of the radio resource. This point also applies to that described below.

Figure 6:
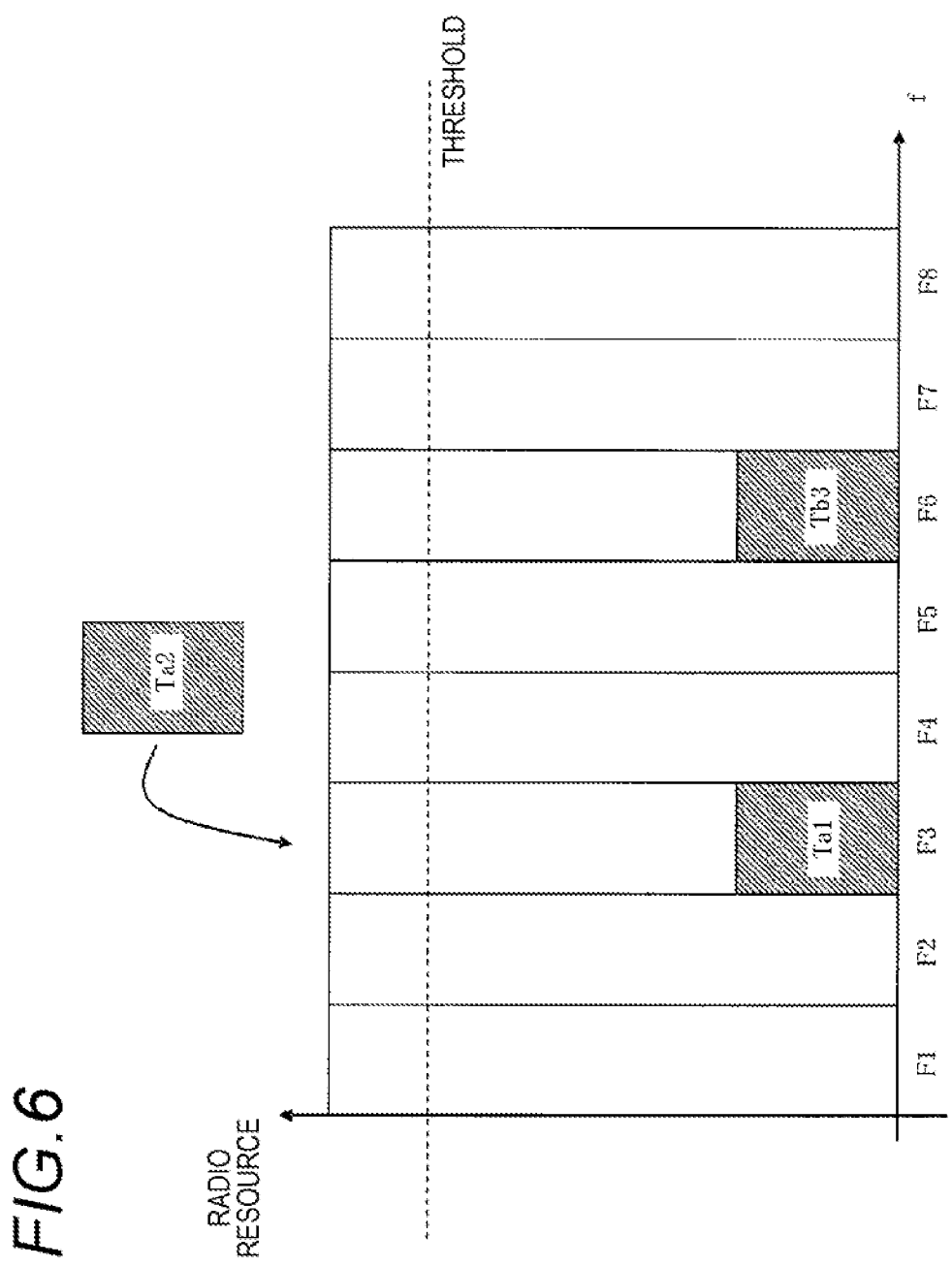
FIG. 6 illustrates a second example of the method of the allocation of the radio resource of the white space frequency by the base station according to the embodiment of the present invention.

FIG. 6 illustrates the second example of the method of the allocation of the radio resource of the WS frequency by the base station 100. In the second example, the base station 100 retains in the internal memory 151 of the RRM unit 150 the same information as in the first example. Referring to the internal memory 151, the RRM unit 150 of the base station 100 determines whether or not an amount of the radio resource (an allocated amount of the radio resource, that is, an amount of the radio resource used) that is allocated to the terminal 200 is at or above a predetermined threshold (for example, 80% of a total amount of the radio resource of the WS frequency). Then, the RRM unit 150 of the base station 100 allocates to the terminal Ta2 the non-allocated radio resource of the WS frequency that has the allocated amount of the radio resource that is below the predetermined threshold. Moreover, in the second example, the allocated amount of the radio resource is the amount of the radio resource that is already allocated to the wireless communication apparatus.

In the example in FIG. 6, the WS frequency that has the radio resource that is allocated to the wireless communication apparatus that is managed by the base station 100 is only the WS frequency F3, and the allocated amount of the radio resource of the WS frequency F3 is below the predetermined threshold. Therefore, the RRM unit 150 of the base station 100 allocates the non-allocated radio resource of the WS frequency F3 to the terminal Ta2.

In this manner, the RRM unit 150 as the radio resource allocating unit allocates to the terminal 200 a non-allocated radio resource of the WS frequency that has the amount of the radio resource allocated to the wireless communication apparatus (the amount of the radio resource used), which is below the predetermined threshold. Accordingly, a change in the allocated amount of the radio resource can be responded to. A detailed description is that because the allocated amount of the radio resource changes with time (the terminal 200 changes by an amount of traffic that occurs) the change can be responded to by reserving a certain margin (20% in the second example). Therefore, the biased use of the radio resource of the one WS frequency is suppressed and a packet transmission delay or a packet loss is difficult to occur. Thus, communication quality is improved.

Figure 7:
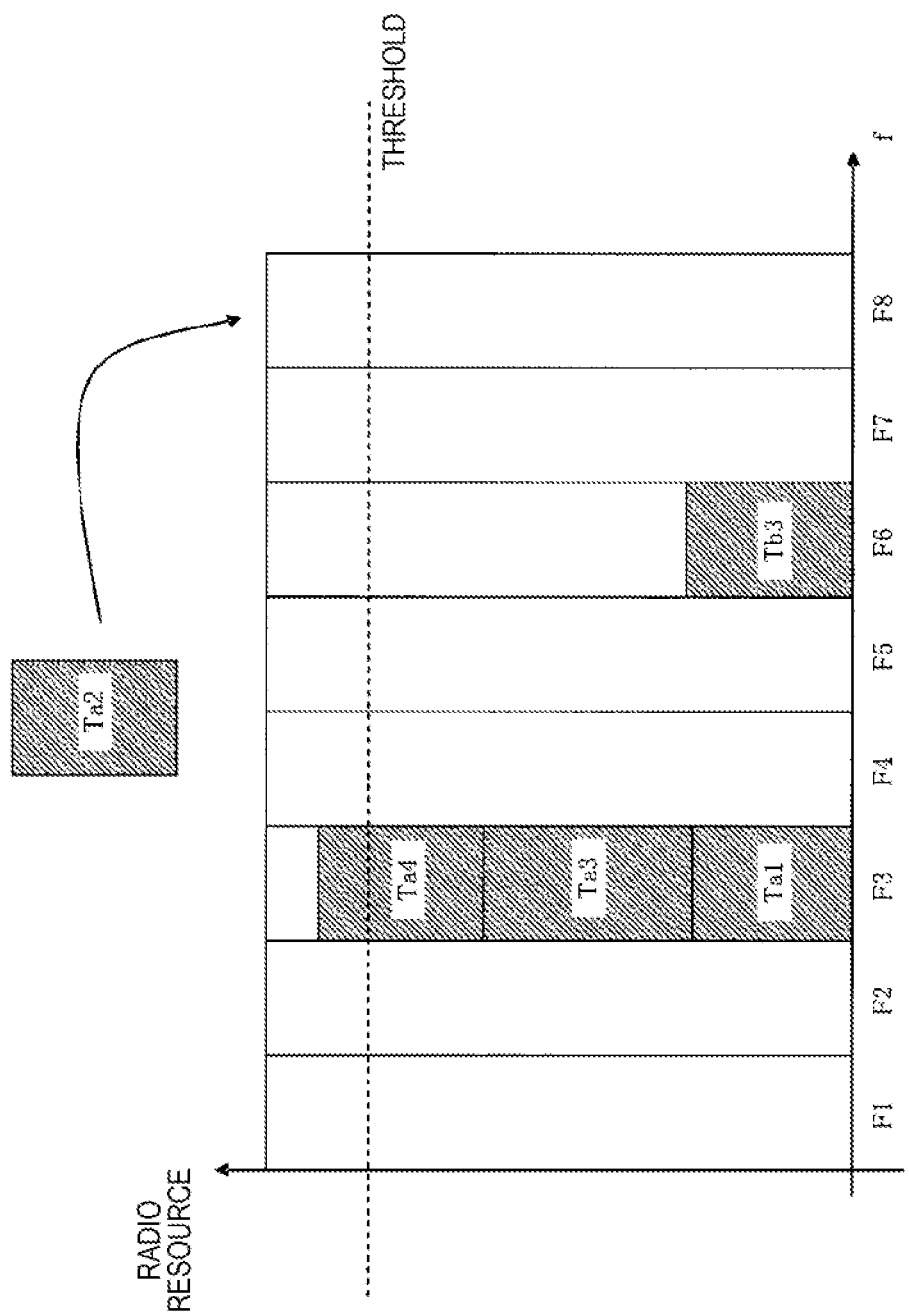
FIG. 7 illustrates a third example of the method of the allocation of the radio resource of the white space frequency by the base station according to the embodiment of the present invention.

FIG. 7 illustrates the third example of the allocation of the radio resource of the WS frequency by the base station 100. In the third example, the base station 100 retains in the internal memory 151 of the RRM unit 150 information that the radio resource of the WS frequency F3 is allocated to the terminals Ta1, Ta3, and Ta4. The RRM unit 150 of the base station 100 performs the same threshold determination in the second example. If the allocated amount of the radio resource of the WS frequency is at or above the predetermined threshold, the RRM unit 150 of the base station 100 allocates to the terminal Ta2 the radio resource of another WS frequency that is not used by another base station and the amount of which is below the predetermined threshold. Whether or not another base station uses the radio resource of another WS frequency can be determined with the scanning processing. Moreover, in the third example, the allocated amount of the radio resource is the amount of the already-allocated radio resource.

In the example in FIG. 7, the WS frequency that has the radio resource that is allocated to the wireless communication apparatus managed by the base station 100 is only the WS frequency F3, and the allocated amount of the radio resource of the WS frequency F3 is the predetermined threshold or above. Therefore, the RRM unit 150 of the base station 100 allocates to the terminal Ta2 the radio resource of another WS frequency (for example, the WS frequency F8) that is not used by the wireless communication apparatus that is managed by another base station. Of course, if the already-allocated WS frequency that is below the predetermined threshold is present, the RRM unit 150 allocates the terminal Ta2 to the already-allocated WS frequency.

In this manner, if the allocated amount of the radio resource is the predetermined threshold or above in the WS frequency having the radio resource that is already allocated to the wireless communication apparatus, the RRM unit 150 as the radio resource allocating unit allocates to the terminal 200 the radio resource of the WS frequency that has the radio resource that is undetected as being used, by the scanning unit 140 as the use-state detecting unit. Additionally, based on the WS search information in the terminal 200, the RRM unit 150 may allocate to the terminal 200 the radio resource of the WS frequency that has the radio resource that is undetected as being used.

Accordingly, the base station 100 can suppress the allocation of a predetermined amount or more of the radio resource of the one WS frequency to the terminal 200 and can allocate to the terminal 200 the radio resource of another WS frequency that has no interference. Therefore, the biased use of the radio resource of the one WS frequency is suppressed and the packet transmission delay or the packet loss is difficult to occur. Thus, high quality communication can be performed by using the WS frequency.

Figure 8:
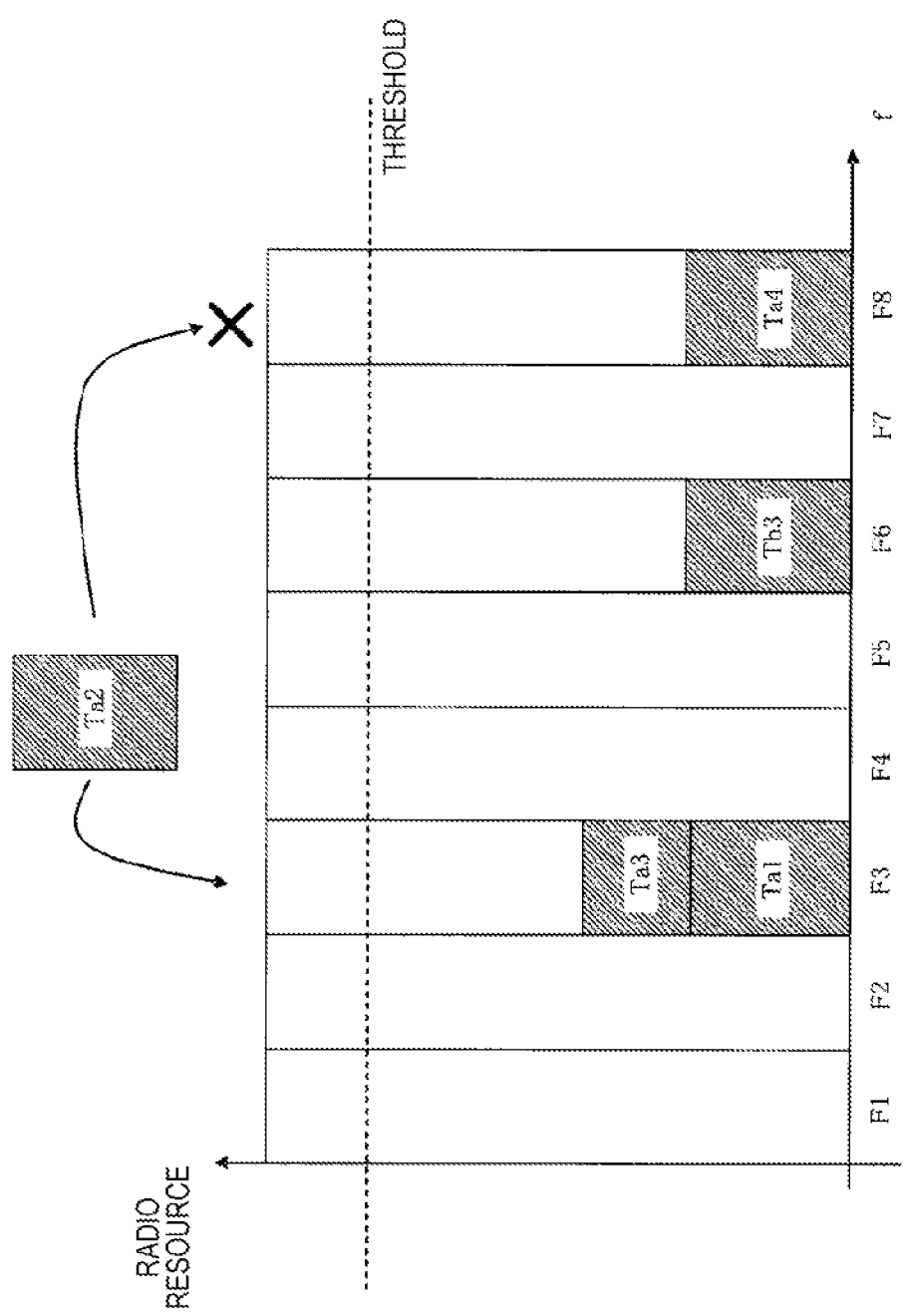
FIG. 8 illustrates a fourth example of the method of the allocation of the radio resource of the white space frequency by the base station according to the embodiment of the present invention.

FIG. 8 illustrates the fourth example of the allocation of the radio resource of the WS frequency by the base station 100. In the fourth example, the base station 100 allocates the radio resource of the WS frequency F3 to the terminals Ta1 and Ta3 and retains in the internal memory 151 of the RRM unit 150 information that the radio resource of the WS frequency F8 is allocated to the terminal Ta4. The RRM unit 150 of the base station 100 performs the same threshold determination as in the second example. Then, if the plurality of WS frequencies, each of which has the already-allocated radio resource and has the allocated amount of the radio resource that is below the predetermined threshold, are present, the RRM unit 150 of the base station 100 allocates to the terminal Ta2 a non-allocated radio resource of the WS frequency that has the largest allocated amount of the radio resource. Moreover, in the fourth example, the allocated amount of the radio resource is the amount of the already-allocated radio resource.

In the example in FIG. 8, the WS frequencies, each of which has the radio resource that is allocated to the wireless communication apparatus that is managed by the base station 100, are the two WS frequencies F3 and F8, and the allocated amount of the radio resource of the WS frequency F3 is larger than the allocated amount of the radio resource of the WS frequency F8. Therefore, the RRM unit 150 of the base station 100 allocates the non-allocated radio resource of the WS frequency F3 to the terminal Ta2.

In this manner, if the plurality of WS frequencies (the WS frequencies F3 and F8 in the fourth example), each of which has the radio resource being used, are present, the RRM unit 150 as the radio resource allocation unit allocates the non-allocated radio resource of the WS frequency that has the radio resource that is mostly allocated to the wireless communication apparatus (here, the radio resource that has the largest allocated amount of the radio resource).

Accordingly, because the radio resource of the WS frequency that has the small amount of the remaining radio resource available for the allocation is allocated to the terminal 200, another WS frequency that has a comparatively large amount of the radio resource available for the allocation can be effectively utilized. In the fourth example, there is a high likelihood that the use of the already-allocated radio resource of another WS frequency will be entirely ended, and it is easy for another WS frequency to be in a non-use-state (a state where the wireless communication apparatus is not allocated). In this case, with the scanning processing, another base station can also detect that another WS frequency is available for use. Then, the wireless communication apparatus that is managed by another base station can also use another WS frequency.

Moreover, in FIG. 8, the radio resource of the WS frequency that has the largest allocated amount of the radio resource is described as being allocated to the terminal Ta2, but the radio resource of the WS frequency that has the highest number of the wireless communication apparatuses (the allocated number of apparatuses) may be allocated to the terminal Ta2. In other words, the RRM unit 150 as the radio resource allocation unit may allocate to the terminal Ta2 the non-allocated radio resource of the WS frequency that has the radio resource that is allocated to apparatuses, the allocated number of which is largest. Alternatively; without the allocated number of the apparatuses, the number of the terminals 200 (the allocated number of terminals) may serve as a reference.

The allocated number of the apparatuses is preferable to the allocated amount of the radio resource. This is because the number of the WS frequencies that are managed by the base station 100 is easy to reduce when the allocated number of the apparatuses serves as the reference. For example, as a result of determining the WS frequency to which the wireless communication apparatus is allocated with the allocated number of apparatuses serving as the reference, five wireless communication apparatuses are allocated to the WS frequency F3 and one wireless communication apparatus is allocated to the WS frequency F8. In this case, even though the one WS frequency F8 uses the wireless communication apparatus F8 rather than the WS frequency F3, there is a high likelihood that this state will result in only a temporary increase in traffic. In other words, there is a low likelihood that the similar radio resources will be always used. Thus, a likelihood that the five wireless communication apparatuses will stop using the radio resource of the WS frequency F3 at the same time is higher than a likelihood that the one wireless communication apparatus will stop using the radio resource of the WS frequency F8. Therefore, there is a high likelihood that the WS frequency F8 will be used also by another base station, and the radio resource of the WS frequency can be efficiently utilized.

From the description above, it is seen that even though the allocated amount of the WS frequency F8 is larger than the allocated amount of the WS frequency F3 in FIG. 8, the RRM unit 150 allocates the WS frequency F3 to the terminal Ta2. In other words, if the WS frequency that has a large allocated number of apparatuses and the WS frequency that has a large allocated amount are present, the RRM unit 150 allocates the wireless communication apparatus to the WS frequency that has the large allocated number of apparatuses.

Moreover, "the allocated amount of the radio resource is largest" may not necessarily mean that the allocated amount of the radio resource is the largest, and may be almost the same amount as the largest allocated amount of the radio resource. For example, if the amounts of the allocated radio resources of the 4 WS frequencies, among the 8 WS frequencies, are large and are almost the same amounts as those of the allocated radio resources, the radio resource of any one of the 4 WS frequencies may be allocated to the terminal 200. This is the same for "the allocated number of the apparatuses to which the radio resource is allocated is highest."

Figure 9:
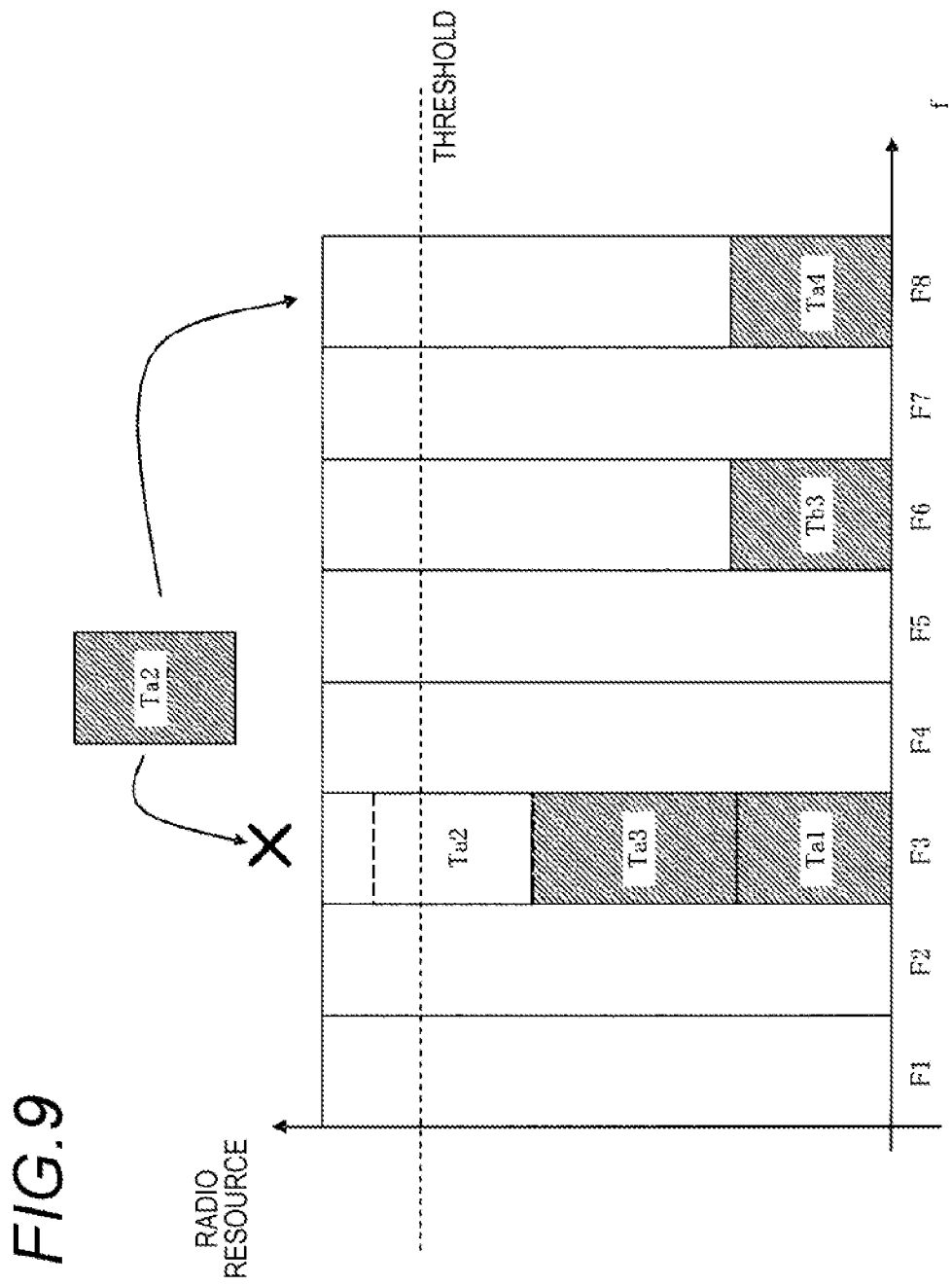
FIG. 9 illustrates a fifth example of the method of the allocation of the radio resource of the white space frequency by the base station according to the embodiment of the present invention.

FIG. 9 illustrates the fifth example of the allocation of the radio resource of the WS frequency by the base station 100. In the fifth example, the base station 100 allocates the radio resource of the WS frequency F3 to the terminals Ta1 and Ta3 and retains in the internal memory 151 of the RRM unit 150 the information that the radio resource of the WS frequency F8 is allocated to the terminal Ta4. The RRM unit 150 of the base station 100 performs the same threshold determination as in the second example. However, the allocated amount of the radio resource here is a total amount that is obtained by adding an amount of the allocation-requested radio resource in the allocation request for the communication frequency and the amount of the radio resource that is already allocated to the wireless communication apparatus that is managed by the base station 100. In other words, the base station 100 performs the threshold determination by adding not only the amount of the already-allocated radio resource but also the amount of the allocation-requested radio resource with respect to the terminal Ta2 that performs the allocation of the radio resource in the future. For example, the terminal 200 that performs the allocation request for the communication frequency causes the amount of the allocation-requested radio resource to be included in the control data, along with the allocation request, and thus transmits the amount of the allocation-requested radio resource to the base station 100.

In the example in FIG. 9, the WS frequencies, each of which has the already-allocated radio resource, are the WS frequencies F3 and F8, and the allocated amount of the radio resource of the WS frequency F3 is larger than the allocated amount of the radio resource of the WS frequency F8. Furthermore, when the amount of the allocation-requested radio resource of the terminal Ta2 is added, the allocated amount of the radio resource of the WS frequency F3 exceeds the predetermined threshold. Therefore, the RRM unit 150 of the base station 100 allocates the non-allocated radio resource of the WS frequency F3 to the terminal Ta2.

With the fifth example of the allocation method, the threshold determination can be performed by adding the radio resource scheduled for allocation. Therefore, even though the radio resource scheduled for allocation is allocated to the terminal 200 as planed, the biased use of the radio resource of the one WS frequency is suppressed, and the packet transmission delay or the packet loss is difficult to occur. Thus, the high quality communication can be performed by using the WS frequency.

Figure 10:
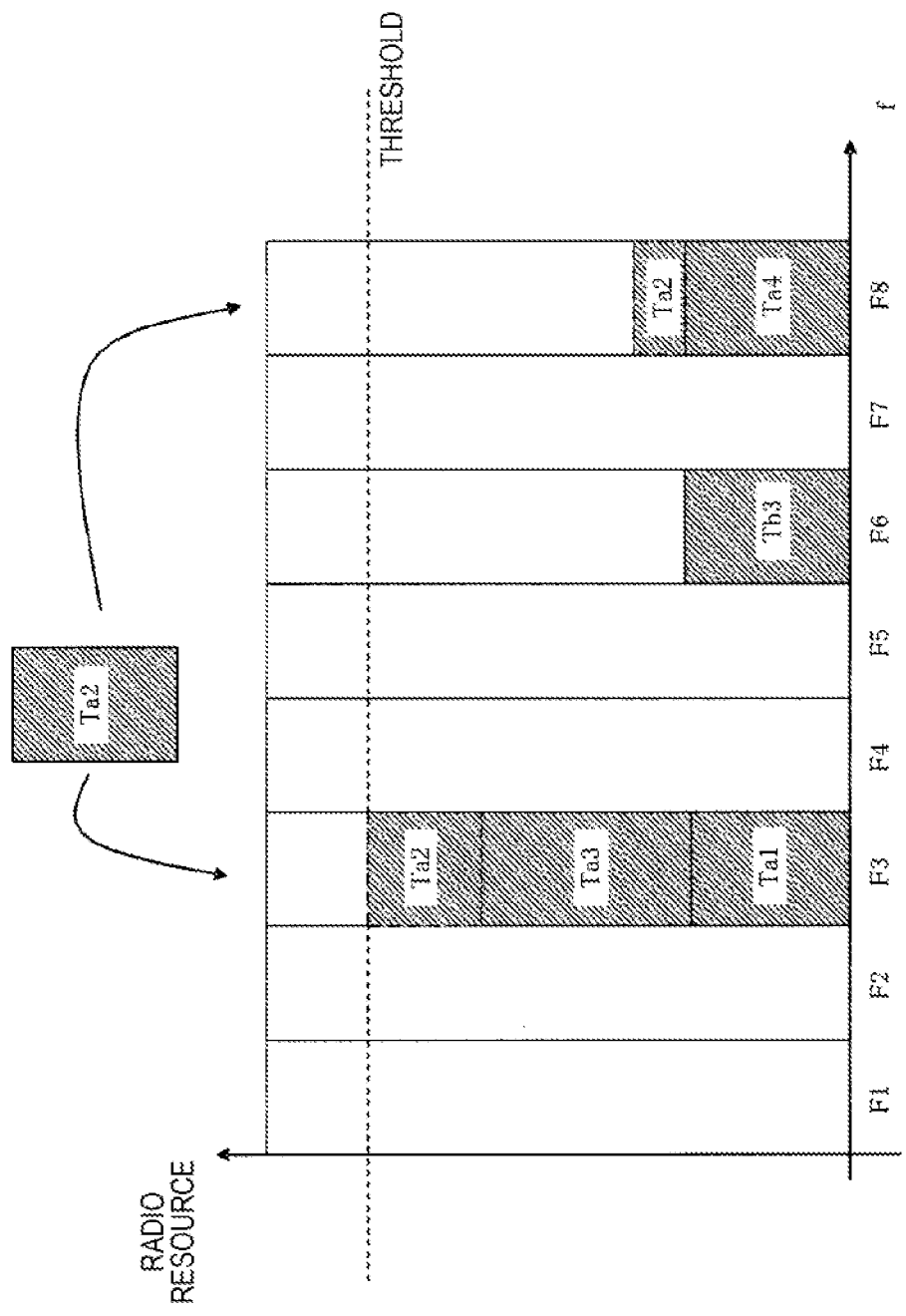
FIG. 10 illustrates a sixth example of the method of the allocation of the radio resource of the white space frequency by the base station according to the embodiment of the present invention.

FIG. 10 illustrates the sixth example of the method of the allocation of the radio resource of the WS frequency by the base station 100. In the sixth example, the base station 100 allocates the radio resource of the WS frequency F3 to the terminals Ta1 and Ta3 and retains in the internal memory 151 of the RRM unit 150 the information that the radio resource of the WS frequency F8 is allocated to the terminal Ta4. In the same manner as in the fifth example, the RRM unit 150 of the base station 100 performs the threshold determination, with the allocated amount of the radio resource being set as the total amount obtained by adding the amount of the allocation-requested radio resource and the amount of the already-allocated radio resource. Furthermore, here, the terminal 200 is assumed to perform the allocation request for the communication frequency.

If the allocated amount of the radio resource of one of the WS frequencies is the predetermined threshold or above, the base station 100 causes the transmission packet generating unit 160 to generate a packet including packet division request information for requesting the division of the transmission packet that is from the terminal 200. Then, the radio transmitting unit 170 transmits the transmission signal including the packet division request information to the terminal Ta2 over the downlink 320. The packet division request information includes information on the amount of the remaining WS frequency available for allocation (on a difference between the predetermined threshold and the amount of the already-allocated radio resource), which is the predetermined threshold or above.

The terminal 200 causes the radio receiving unit 220 to receive the packet including the packet division request information from the base station 100. Then, the transmission packet generating unit 260 divides the transmission packet (the transmission packet that the terminal 200 has to transmit) into a plurality of division packets corresponding to the amount of the allocation-requested radio resource that is referred to in the base station 100. At this time, the total amount, which is obtained by adding the amount of the allocation-requested radio resource for transmitting the division packet and the amount of the already-allocated radio resource, is adjusted in such a manner as to fall below the predetermined threshold.

Additionally the terminal 200 causes the transmission packet generating unit 260 to generate the transmission packet that includes division allocation request information for requesting the allocation of the communication frequency to the terminal 200, in the division packet. The transmission packet is generated that includes the division allocation request information that includes information on a request for the allocation for the division packet and information on the division packet such as how to divide the packet. Information on an amount of a divisionally-allocated radio resource and the information on the division packet may be generated for every division packet. The radio transmitting unit 270 transmits the transmission signal including these pieces of information to the base station 100 over the uplink 320.

The base station 100 causes the radio receiving unit 120 to receive the signal including the division allocation request information from the terminal 200. Then, based on the division allocation request information, the RRM unit 150 allocates the radio resources of the plurality of WS frequencies to the terminal 200 in response to the allocation request that is for the plurality of division packets. At this time, in response to the allocation request for the one division packet, the non-allocated radio resource of the WS frequency that has the allocated radio resource that is the predetermined threshold or above is allocated to the terminal 200, and in response to the allocation request for another division packet, the radio resource of the WS frequency other than the non-allocated radio resource of such a WS frequency is allocated to the terminal 200.

In the example in FIG. 10, the WS frequencies, each of which has the already-allocation radio resource, are the WS frequencies F3 and F8, and the allocated amount of the radio resource of the WS frequency F3 is larger than the allocated amount of the radio resource of the WS frequency F8. Furthermore, when the amount of the allocation-requested radio resource of the terminal Ta2 is added, the allocated amount of the radio resource of the WS frequency F3 exceeds the predetermined threshold.

Therefore, the base station 100 transmits the signal including the packet division request information in such a manner that the terminal Ta2 divides the transmission packet scheduled for transmission. The terminal Ta2 receives the packet division request information and divides the transmission packet scheduled for transmission into a plurality of packets. In FIG. 10, the transmission packet is divided into two items of division data. The terminal Ta2 transmits the transmission signal including the division allocation request information. The base station 100 receives the signal including the division allocation request information, and allocates the radio resources of the plurality of WS frequencies to the terminal Ta2 with respect to each division packet, based on the division allocation request information. In the example in FIG. 10, in response to the allocation request for the two division packets, the non-allocated radio resources of the WS frequency F3 that has the allocated amount of the radio resource that exceeds the predetermined threshold and of the WS frequency F8 that has the already-allocated radio resource are allocated to terminal Ta2.

In this manner, if the allocated amount of the radio resource is the predetermined threshold or above in the WS frequency that has the radio resource that is already allocated to the wireless communication apparatus, the radio transmitting unit 170 as a transmitting unit transmits the packet division request information for requesting the division of the transmission-target packet, to the terminal 200 that performs the allocation request, the radio receiving unit 120 as a receiving unit receives division information on the packet in association with the packet division request information, and the RRM unit 150 as the radio resource allocation unit allocates the non-allocated resource of the WS frequency that has the allocated amount of the radio resource that is the predetermined threshold or above and the non-allocated radio resource of another WS frequency, based on the received division information on the packet.

Accordingly, the radio resource of the WS frequency that has the already-allocated radio resource can be used to the maximum.

Figure 11:
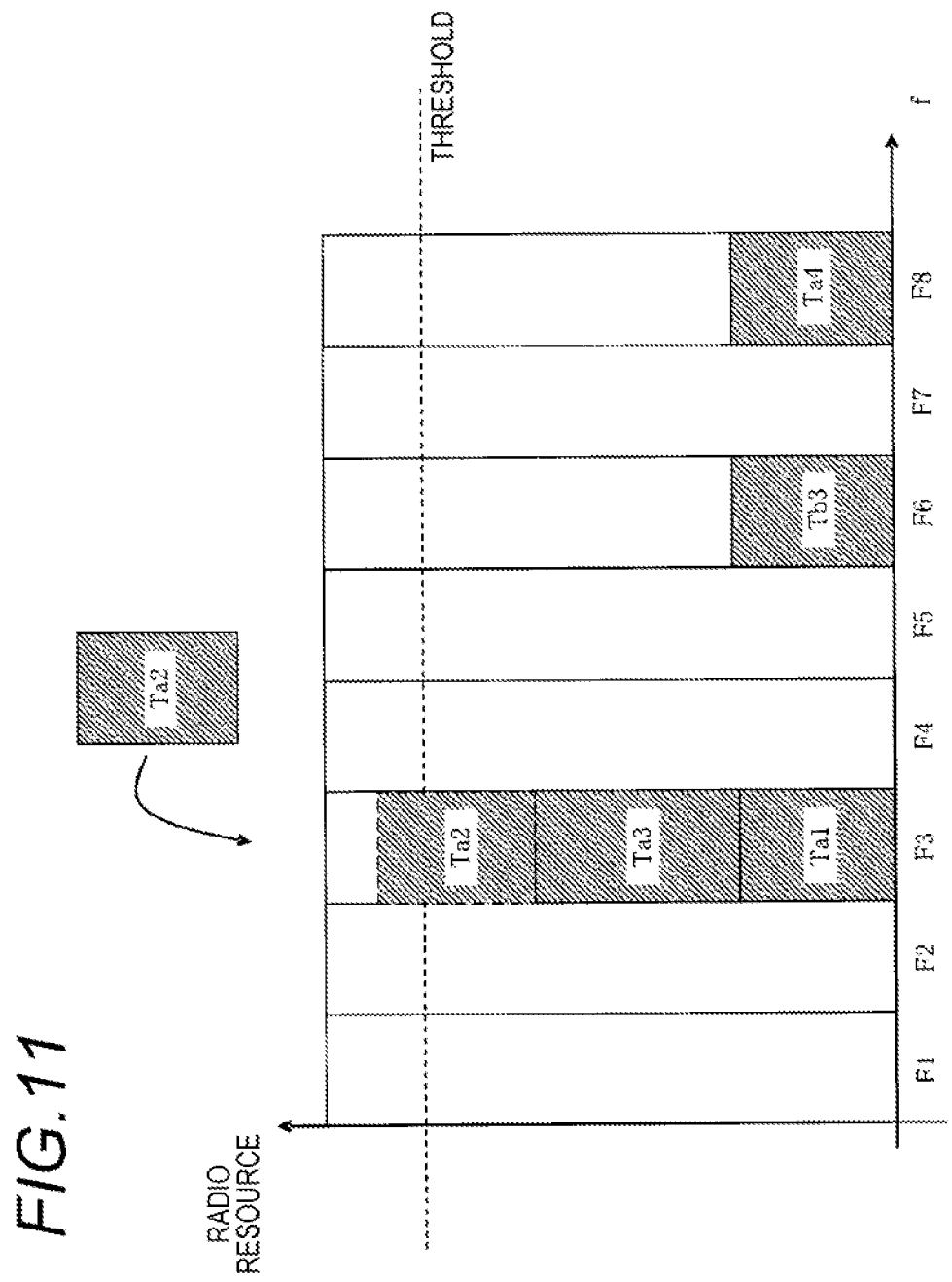
FIG. 11 illustrates a seventh example of the method of the allocation of the radio resource of the white space frequency by the base station according to the embodiment of the present invention.

FIG. 11 illustrates the seventh example of the method of the allocation of the radio resource of the WS frequency by the base station 100. In the seventh example, the base station 100 allocates the radio resource of the WS frequency F3 to the terminals Ta1 and Ta3 and retains in the internal memory 151 of the RRM unit 150 the information that the radio resource of the WS frequency F8 is allocated to the terminal Ta4. The RRM unit 150 of the base station 100 performs the same threshold determination as in the second example. However, even though the allocated amount of the radio resource of the WS frequency is the predetermined threshold or above, the non-allocated radio resource of such a WS frequency is allocated to the terminal Ta2 differently than in the third example. In other words, the radio resource of the WS frequency is allocated to the terminal Ta2 by exceeding the predetermined threshold. Moreover, here, the allocated amount of the radio resource may be only the amount of the already-allocated radio resource, and may be the total amount that is obtained by adding the amount of the requested radio resource in the allocation request of the terminal Ta2 for the frequency and the amount of the radio resource that is already allocated to the wireless communication apparatus that is managed by the base station 100.

In the example in FIG. 11, the WS frequencies, each of which has the radio resource that is allocated to the wireless communication apparatus that is managed by the base station 100, are the WS frequencies F3 and F8, and the allocated amount of the radio resource of the WS frequency F3 is the predetermined threshold or above. Therefore, the RRM unit 150 of the base station 100 allocates the non-allocated radio resource of the WS frequency F3 to the terminal Ta2.

The allocated amount of the radio resource that the base station 100 manages with the internal memory 151 of the RRM unit 150 is an average allocated amount of the radio resource in a situation where the base station 100 is put in place, and for example, even though the allocated amount exceeds the predetermined threshold, the non-allocated radio resource remains. Furthermore, even though the radio resource is insufficient, because the communication delay occurs to some extent, this does not have a great effect on the communication. In this case, the radio resource of the WS frequency can be effectively utilized while maintaining minimum communication quality, by forcibly allocating the non-allocated radio resource of such a WS frequency to the terminal 200 in response to the allocation request.

Next, an example of operation of the base station 100 is described.

Figure 12:
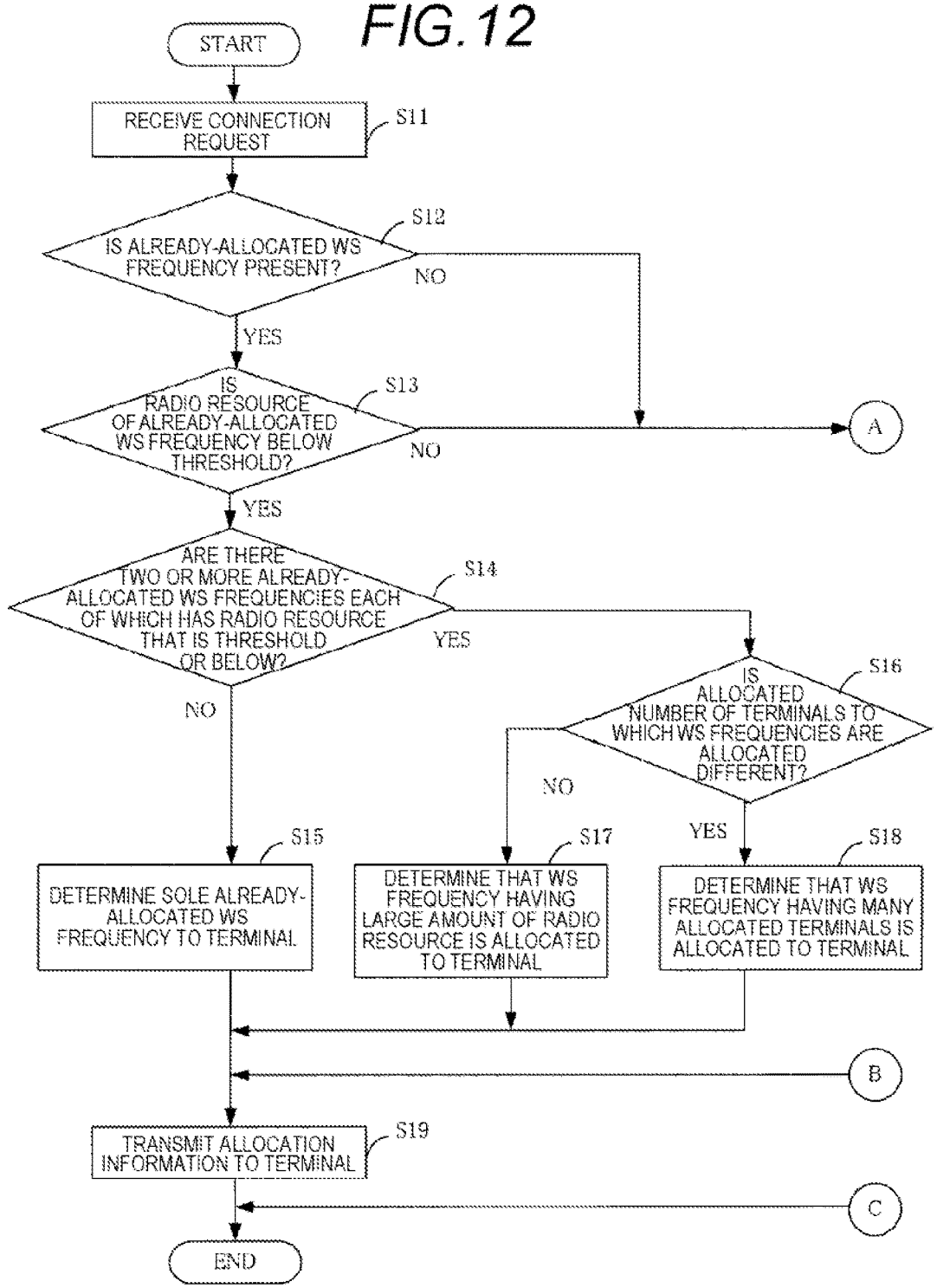
FIG. 12 is a flow chart illustrating an example of an operation that is performed when the radio resource of the white space frequency is allocated by the wireless base station apparatus according to the embodiment of the present invention.
Figure 13:
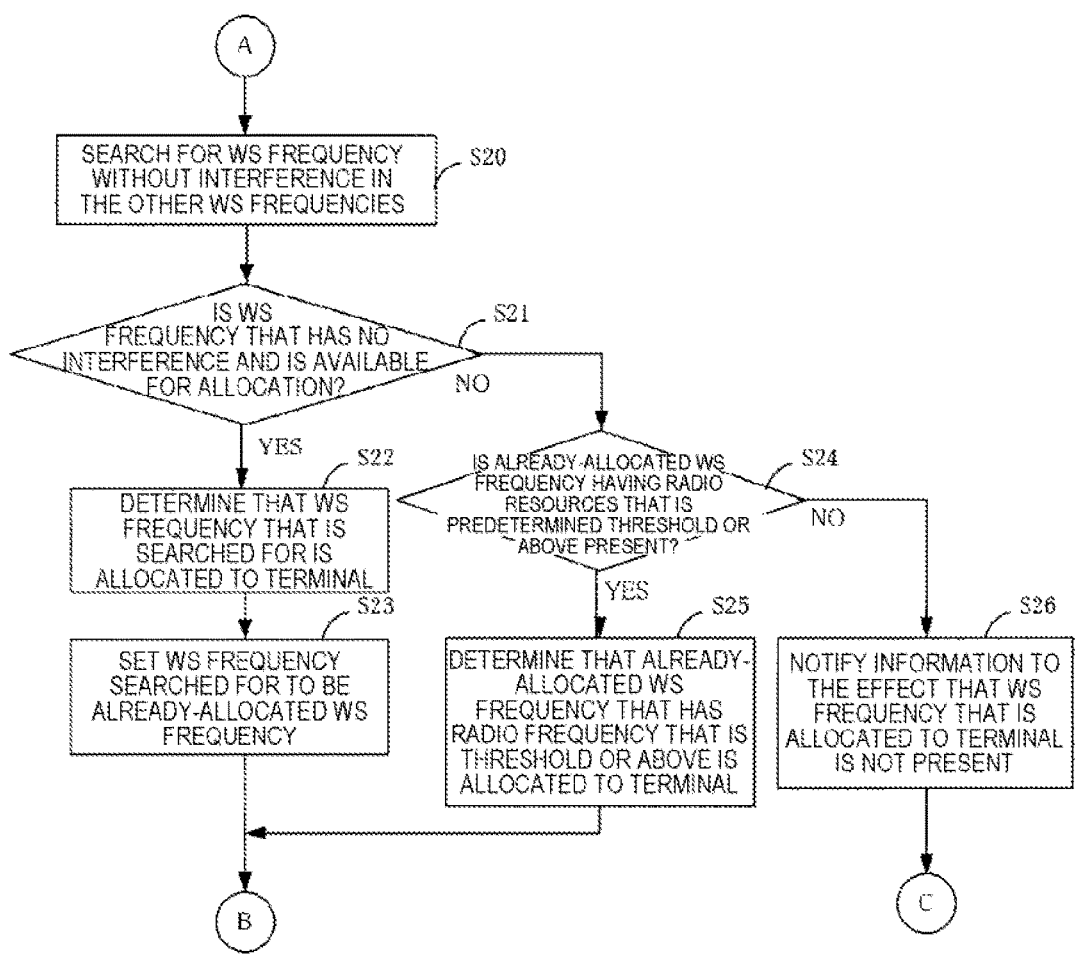
FIG. 13 is a flow chart illustrating the example of the operation that is performed when the radio resource of the white space frequency is allocated by the wireless base station apparatus according to the embodiment of the present invention (continued from FIG. 12).

FIGS. 12 and 13 are flow charts that illustrate an example of the operation that is performed when the base station 100 allocates the radio resource of the WWS frequency. A radio resource management program that performs such an operation is stored in a ROM in the base station 100 and is run by a CPU in the base station 100.

In FIGS. 12 and 13, the terminal 200 is assumed to perform a connection request for performing the communication with the base station 100. The connection request, for example, is communicated by the scanning processing by the scanning unit 240 of the terminal 200, using the radio resource of the WS frequency that is presumed not to be used. Furthermore, frequency bands (frequency bands dedicated to the connection request, occupied frequency bands, and the like) other than the frequency band to which the WS frequency is allocated may be used.

First, the radio receiving unit 120 receives the connection request from the terminal 200 (Step S11 in FIG. 12). The connection request includes the allocation request for the communication frequency.

Subsequently, the RRM unit 150 determines whether or not the WS frequency (i.e., the already-allocated WS frequency) that has the already-allocated radio resource is present (Step S12). If the already-allocated WS frequency is not present, the process proceeds to Step S20 in FIG. 13.

If the already-allocated WS frequency is present, the RRM unit 150 determines whether or not the allocated amount of the radio resource of the already-allocated WS frequency is below the predetermined threshold (Step S13). If the allocated amount of the radio resource of the already-allocated WS frequency is the predetermined threshold or above, the process proceeds to Step S20 in FIG. 13.

If the allocated amount of the radio resource of the already-allocated WS frequency is below the predetermined threshold, the RRM unit 150 determines whether or not the plurality of already-allocated WS frequencies, each of which has the allocated amount of the radio resource that is below the threshold, are present (Step S14).

If the plurality of already-allocated WS frequencies, each of which has the allocated amount of the radio resource that is below the threshold are not present and only one such already-allocated WS frequency is present, the RRM unit 150 determines that the radio resource of the sole already-allocated WS frequency is allocated to the terminal 200 in response to the allocation request of the terminal 200 (Step S15).

If the plurality of already-allocated WS frequencies, each of which has the allocated amount of the radio resource that is below the threshold, are present, the RRM unit 150 determines whether or not the allocated number of the terminals to which the radio resources of these WS frequencies are allocated differs (Step S16).

If the allocated number of the terminals is the same, the RRM unit 150 determines that the radio resource of the WS frequency that has the large allocated amount of the radio resource is allocated to the terminal 200 in response to the allocation request of the terminal 200 (Step S17).

If the allocated number of the terminals differs, the RRM unit 150 determines that the radio resource of the WS frequency that has the high allocated number of the terminals is allocated to the terminal 200 in response to the allocation request of the terminal 200 (Step S18).

After the processing tasks in Steps S15, S17, or S18, the radio transmitting unit 170 causes allocation information on the radio resource of the determined WS frequency to be included in the RRM control information on the uplink 310 (refer to FIG. 2) and thus transmits the allocation information to the terminal 200 that performs the connection request (Step S19). Then, the base station 100 ends the present processing.

If the already-allocated WS frequency is not present in Step S12, or if the allocated amount of the radio resource of the already-allocated WS frequency is the predetermined threshold or above in Step S13, the scanning unit 140 performs the scanning processing and searches for the WS frequency without interference in the other WS frequencies (the WS frequency that does not include the already-allocated radio resource) (Step S20 in FIG. 13).

Subsequently, the RRM unit 150 determines whether or not the WS frequency that has the radio resource that has no interference and is available for allocation is present (Step S21).

If the WS frequency that has the radio resource that has no interference and is available for allocation is present, the RRM unit 150 determines that the radio resource of such a WS frequency that is searched for by the scanning unit 140 is allocated to the terminal 200 in response to the allocation request of the terminal 200 (Step S22). Furthermore, the RRM unit 150 sets such a WS frequency, which is searched for by the scanning unit 140, to be the already-allocated WWS frequency (Step S23).

If the WS frequency that has the radio resource that has no interference and is available for allocation is not present in Step S21, the RRM unit 150 determines whether or not the already-allocated WS frequency is present that has the allocated amount of the radio resource that is the predetermined threshold or above (Step S24).

If the already-allocated WS frequency is present that has the allocated amount of the radio resource that is the predetermined threshold or above, the RRM unit 150 determines that the radio resource of such an already-allocated WS frequency is allocated to the terminal 200 in response to the allocation request of the terminal 200 (Step S25). After Step S25, the process proceeds to Step S19 in FIG. 12.

If the already-allocated WS frequency is not present that has the allocated amount of the radio resource that is the predetermined threshold or above, the radio transmitting unit 170 causes information to the effect that the radio resource of the WS frequency that is allocated to the terminal 200 that performs the connection request is not present to be included in the transmission packet and thus transmits the information (Step S26). Then, the base station 100 ends the present processing.

Moreover, the same processing as in Step S26 may be performed in Step S25.

Furthermore, in FIGS. 12 and 13, the allocation of the radio resource of the WS frequency to the terminal 200 is described as being performed in response to the connection request from the terminal 200 (that is, the terminal 200 is described as determining the WS frequency and the radio resource that are used at the time of the communication that uses the uplink 310). However, when the base station 100 by itself performs the communication, the allocation request for the communication frequency may be made to occur within the base station 100 (the RRM unit 150) and the radio resource of the WS frequency may be allocated to the base station 100 in response to such an allocation request (that is, the base station 100 may determine the WS frequency and the radio resource that are used at the time of the communication that uses the downlink 320). That is, the first to seventh examples can be applied also to the determination of the WS frequency in the downlink.

Furthermore, if communication traffic is increased in the midst of performing the communication that uses the WS frequency, the availability of only the radio resource of the WS frequency that is already allocated to the terminal 200 can cause a resource shortage as well. In this case, the RRM unit 150 may uninterruptedly allocate the radio resource of the WS frequency that is already allocated to the terminal 200, to the terminal 200 even though this causes it to the predetermined threshold, and may regard such a case as an occurrence of a new allocation request that is equivalent to Step S11 in FIG. 12 and allocate to the terminal 200 the radio resource of the WS frequency available for allocation.

Moreover, the present invention is not limited to the embodiments described above, and can be applied to whatever configuration can accomplish functions recited in claims, or functions performed by the configuration of each of the embodiments described above.

According to the embodiments described above, it is illustrated that the information indicating the allocated state of the radio resource of the WS frequency is retained in every base station 100, but the base stations 100 that belong to the same communication service provider may cooperate with one another. In other words, the base stations A1 and A2 illustrated in FIG. 1 may cooperate with each other, and may notify each other of the information indicating the allocated state of the radio resource of the WS frequency to share such information with each other. In this case, the WS frequency to which the wireless communication apparatus is allocated by the base station A1 becomes the already-allocated WS frequency in the base station A2 as well. Furthermore, the sharing of the information may be performed among the different communication service providers (for example, the base stations A1 and A2, and the base stations B1 and B2) as well.

Furthermore, the base station 100 and the terminal 200 according to the embodiments described above may be the wireless communication apparatuses that perform the communication that uses only the WS frequency and may be the wireless communication apparatuses that perform the communication using the WS frequency and the occupied frequency.

Furthermore, according to the embodiments described above, the RRM unit 150 of the base station 100 allocates not only the WS frequency but also the radio resource to the terminal 200, but at least only the allocation of the WS frequency may be performed. That is, the allocation of the radio resource may be performed by the RRM unit 250 of the terminal 200. In this case, the terminal 200 may notify the base station 100 of a result of allocating the radio resource.

Furthermore, according to the embodiments, the scanning processing described above may be performed in response to the allocation request, taking advantage of a determination that the WS frequency available for allocation is not present, but may be periodically performed or may be performed in a stage of receiving the allocation request. Furthermore, the scanning processing may be performed only in the terminal 200, and not in the base station 100.

Furthermore, the scope of the present invention includes a radio resource management program realizing the function according to the embodiments described above as well, which is supplied to a communication apparatus over a network or through various storage media and which is read by a computer (a CPU) within the communication apparatus and is executed.

Figure 14:
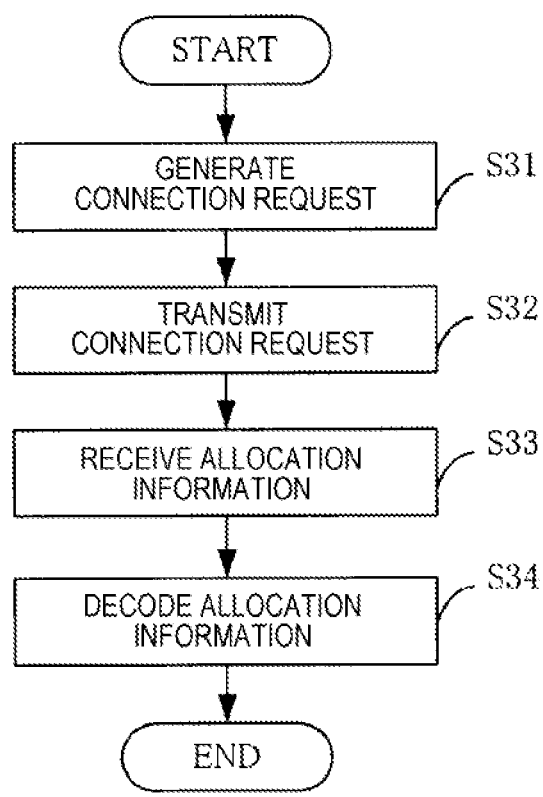
FIG. 14 is a flow chart illustrating an operation example of the wireless communication terminal according to the embodiment of the present invention.

Furthermore, the terminal 200 performs an operation that is paired with the operation of the base station 100 that is described referring to FIGS. 12 and 13. FIG. 14 is a flow chart illustrating an operation example of the terminal 200.

The transmission packet generating unit 260 of the terminal 200 generates the connection request (Step S31) and the radio transmitting unit 270 transmits such a connection request to the base station 100 through the transmission antenna 280 (Step S32). Then, the base station 100 causes the radio receiving unit 220 of the terminal 200 to receive the allocation information through the reception antenna 210 (Step S33), and the received packet decoding unit 230 decodes such an allocation information (Step S34).

Moreover, as described above, the allocation information relates to the radio resource of the WS frequency. Thus, the radio transmitting unit 270 transmits the signal, based on such allocation information. For example, the communication is performed using the WS frequency that is allocated by the base station 100.

A detailed description is made. If the already-allocated WS frequency is present, the terminal 200 obtains information on such an already-allocated WS frequency (a first WS frequency), among the plurality of WS frequencies, by receiving the allocation information and performs the communication using such an already-allocated WS frequency (the first WS frequency).

Furthermore, if the plurality of already-allocated WS frequencies are present, the terminal 200 obtains information on the already-allocated WS frequency (a second IS frequency) to which many of the terminals are allocated, among the plurality of already-allocated WS frequencies, by receiving the allocation information and performs the communication using such an already-allocated WWS frequency (the second WS frequency).

Furthermore, the terminal 200 obtains information on the already-allocated WS frequency (a third WS frequency) that has a large allocated amount of the radio resource, among the plurality of already-allocated WS frequencies, and performs the communication using such an already-allocated WS frequency (the third WS frequency).

The present invention is described in detail or is described referring to the specific embodiments, but it is apparent to a person of ordinary skill in the art that various changes or modifications can be made without deviating from the spirit and scope of the present invention.

The present application is based on Japanese Patent Application No. 2011-239529, filed on Oct. 31, 2011, the contents of which are incorporated by reference herein.

INDUSTRIAL APPLICABILITY

The present invention is useful in a radio base station apparatus, a radio resource management method, a radio resource management program, a wireless communication apparatus, a wireless communication system and the like.

REFERENCE SIGNS LIST

100, A1, A2, B1, B2: BASE STATION (RADIO BASE STATION APPARATUS)
110: RECEPTION ANTENNA
120: RADIO RECEIVING UNIT
130: RECEIVED PACKET DECODING UNIT
140: SCANNING UNIT
150: RRM UNIT
151: INTERNAL MEMORY
160: TRANSMISSION PACKET GENERATING UNIT
170: RADIO TRANSMITTING UNIT
180: TRANSMISSION ANTENNA
200: Ta1 to Ta6, Tb1 to Tb3 TERMINAL (WIRELESS COMMUNICATION TERMINAL)
210: RECEPTION ANTENNA
220: RADIO RECEIVING UNIT
230: RECEIVED PACKET DECODING UNIT
240: SCANNING UNIT
250: RRM UNIT
260: TRANSMISSION PACKET GENERATING UNIT
270: RADIO TRANSMITTING UNIT
280: TRANSMISSION ANTENNA

The invention claimed is:

1. A radio base station apparatus, comprising:
a scanner, which, in operation, detects a use-state of a white space frequency in a neighborhood of the radio base station apparatus, and identifies a vacant white space frequency that is not allocated to any wireless terminal managed by the radio base station apparatus of a communication service provider or by another radio base station apparatus of another communication service provider, and
a radio resource allocating unit, which, in response to an allocation request for a communication frequency from a new wireless terminal, identifies a first white space frequency that is allocated to another wireless terminal managed by the radio base station apparatus and is not allocated to any wireless terminal managed by the another radio base station apparatus, and determines whether an amount of allocated radio resource of the first white space frequency is or above a threshold, wherein,
when the amount of allocated radio resource of the first white space frequency is below the threshold, the radio resource allocation unit preferentially allocates to the new wireless terminal a vacant radio resource of the first white space frequency over a vacant radio resource of the vacant white space frequency, while continuing to allocate the first white space frequency to the another wireless terminal managed by the radio base station apparatus, and
when the amount of allocated radio resource of the first white space frequency is or above the threshold, the radio resource allocation unit allocates to the new wireless terminal a vacant radio resource of the vacant white space frequency, while continuing to allocate the first white space frequency to the another wireless terminal managed by the radio base station apparatus.

2. The radio base station apparatus according to claim 1, wherein
if the first white space frequency and a second white space frequency are present, the radio resource allocating unit allocates the second white space frequency to the new wireless terminal, wherein more other wireless terminals are allocated to the second white space frequency than to the first white space frequency.

3. The radio base station apparatus according to claim 2, wherein
if a third white space frequency is present, the radio resource allocating unit allocates the third white space frequency to the new wireless terminal, wherein the third white space frequency has a larger amount of allocated radio resource than the first white space frequency.

4. The radio base station apparatus according to claim 1, wherein
the radio resource allocating unit, in operation, allocates to the new wireless terminal a white space frequency that has an amount of allocated radio resource that is below the threshold.

5. The radio base station apparatus according to claim 1, further comprising:
a receiving unit, which, in operation, receives information on a use-state of a white space frequency in a neighborhood of the new wireless terminal from the new wireless terminal.

6. The radio base station apparatus according to claim 1, wherein
the amount of allocated radio resource is an amount of radio resource that is already allocated to the another wireless terminal managed by the radio base station apparatus.

7. The radio base station apparatus according to claim 1, wherein
the amount of allocated radio resource is a total amount that is obtained by adding an amount of radio resource that is already allocated to the another wireless terminal managed by the radio base station apparatus and an amount of radio resource allocation that is requested in the allocation request for a communication frequency from the new wireless terminal.

8. The radio base station apparatus according to claim 7, further comprising:
a transmitting unit, which, in operation, transmits packet division request information for requesting division of a transmission-target packet, to the new wireless terminal, if the amount of allocated radio resource of the first white space frequency is or above the threshold; and
a receiving unit, which, in operation, receives division information on the transmission-target packet in association with the packet division request information, wherein
the radio resource allocating unit, in operation, allocates to the new wireless terminal a vacant radio resource of the first white space frequency and a vacant radio resource of another white space frequency based on the division information on the transmission-target packet which is received by the receiving unit.

9. The radio base station apparatus according to claim 3, wherein
if the second white space frequency and the third white space frequency are present, the radio resource allocating unit allocates the second white space frequency to the new wireless terminal.

10. The radio base station apparatus according to claim 1, wherein
the radio resource has a plurality of resource blocks divided in a frequency domain.

11. The radio base station apparatus according to claim 1, wherein
the radio resource has a plurality of resource blocks divided in a time domain.

12. A radio resource management method performed by a radio base station apparatus, the method comprising:
detecting a use-state of a white space frequency in a neighborhood of the radio base station apparatus, and identifying a vacant white space frequency that is not allocated to any wireless terminal managed by the radio base station apparatus of a communication service provider or by another radio base station apparatus of another communication service provider;
in response to an allocation request for a communication frequency from a new wireless terminal, identifying a first white space frequency that is allocated to another wireless terminal managed by the radio base station apparatus and is not allocated to any wireless terminal managed by the another radio base station apparatus, and determining whether an amount of allocated radio resource of the first white space frequency is or above a threshold;
when the amount of allocated radio resource of the first white space frequency is below the threshold, preferentially allocating to the new wireless terminal a vacant radio resource of the first white space frequency over a vacant radio resource of the vacant white space frequency, while continuing to allocate the first white space frequency to the another wireless terminal managed by the radio base station apparatus, and
when the amount of allocated radio resource of the first white space frequency is or above the threshold, allocating to the new wireless terminal a vacant radio resource of the vacant white space frequency, while continuing to allocate the first white space frequency to the another wireless terminal managed by the radio base station apparatus.

13. A non-transitory storage medium in which a radio resource management program is stored for causing a computer to execute each step of the radio resource management method according to claim 12.

14. A wireless terminal that is managed by a radio base station apparatus of a communication service provider, the wireless terminal comprising:
a receiving unit, which, in operation, receives information on a vacant radio resource of a first white space frequency and on a vacant radio resource of a vacant white space frequency, wherein,
the first white space frequency is allocated to another wireless terminal managed by the radio base station apparatus and is not allocated to any wireless terminal managed by another radio base station apparatus of another communication service provider,
the vacant white space frequency is not allocated to any wireless terminal managed by the radio base station apparatus or by the another radio base station apparatus,
when an amount of allocated radio resource of the first white space frequency is below a threshold, a vacant radio resource of the first white space frequency is preferentially allocated to the wireless terminal over a vacant radio resource of the vacant white space frequency, wherein the first white space frequency continues to be allocated to the another wireless terminal managed by the radio base station apparatus, and
when the amount of allocated radio resource of the first white space frequency is or above the threshold, a vacant radio resource of the vacant white space frequency is allocated to the wireless terminal, wherein the first white space frequency continues to be allocated to the another wireless terminal managed by the radio base station apparatus; and
a transmitting unit, which, in operation, transmits a signal by using an allocated radio resource indicated by the information received by the receiving unit.

15. The wireless terminal according to claim 14, wherein if there is a second white space frequency to which more other wireless terminals are allocated than to the first white space frequency, the receiving unit receives information relating to the second white space frequency and the transmitting unit transmits a signal by using the second white space frequency.

16. The wireless terminal according to claim 14, wherein if there is a third white space that has a larger amount of allocated radio resource than that of the first white space frequency, the receiving unit receives information relating to the third white space frequency and the transmitting unit transmits a signal by using the third white space frequency.

17. The wireless terminal according to claim 14, wherein the transmitting unit, in operation, transmits an allocation request for a communication frequency to the radio base station apparatus of the communication service provider.

18. A wireless communication system, comprising:
a first wireless terminal; and
a radio base station apparatus of a communication service provider, the radio base station apparatus including:
a scanner, which, in operation, detects a use-state of a white space frequency in a neighborhood of the radio base station apparatus, and identifies a vacant white space frequency that is not allocated to any wireless terminal managed by the radio base station apparatus of a communication service provider or by another radio base station apparatus of another communication service provider, and
a radio resource allocating unit, which, in response to an allocation request for a communication frequency from the first wireless terminal, identifies a first white space frequency that is allocated to another wireless terminal managed by the radio base station apparatus and is not allocated to any wireless terminal managed by the another radio base station apparatus, and determines whether an amount of allocated radio resource of the first white space frequency is or above a threshold, wherein, when the amount of allocated radio resource of the first white space frequency is below the threshold, the radio resource allocation unit preferentially allocates to the first wireless terminal a vacant radio resource of the first white space frequency over a vacant radio resource of the vacant white space frequency, while continuing to allocated the first white space frequency to the another wireless terminal managed by the radio base station apparatus, and when the amount of allocated radio resource of the first white space frequency is or above the threshold, the radio resource allocation unit allocates to the first wireless terminal a vacant radio resource of the vacant white space frequency, while continuing to allocate the first white space frequency to the another wireless terminal managed by the radio base station apparatus, and the first wireless terminal, in operation, performing communication with the radio base station apparatus using a radio resource allocated to the first wireless terminal by the radio base station apparatus.

19. The radio base station apparatus according to claim 1, wherein the radio resource allocating unit, in operation, responds to the allocation request for a communication frequency from the new wireless terminal by preferentially allocating to the new wireless terminal a vacant radio resource of the first white space frequency over a vacant radio resource of a white space frequency allocated to a wireless terminal that is managed by the another radio base station while continuing to allocate the radio resource of the first white space frequency to the another wireless terminal that is managed by the radio base station apparatus.

20. The radio base station apparatus according to claim 1, wherein, when the amount of allocated radio resource of the first white space frequency is or above the threshold, the radio resource allocating unit preferentially allocates to the new wireless terminal the vacant radio resource of the vacant white space frequency over a vacant radio resource of a white space frequency allocated to a wireless terminal managed by the another radio base station apparatus.

* * * * *